(12) United States Patent
Endo et al.

(10) Patent No.: US 9,678,661 B2
(45) Date of Patent: Jun. 13, 2017

(54) RETRIEVAL DEVICE FOR RETRIEVING DATA SPECIFIC INFORMATION USED FOR IDENTIFYING DATA OF A DATA GROUP

(71) Applicant: KYOCERA Document Solutions Inc., Osaka (JP)

(72) Inventors: Wataru Endo, Osaka (JP); Yoshitaka Matsuki, Osaka (JP); Satoshi Kawakami, Osaka (JP)

(73) Assignee: KYOCERA Document Solutions Inc. (JP)

( * ) Notice: Subject to any disclaimer, the term of this patent is extended or adjusted under 35 U.S.C. 154(b) by 397 days.

(21) Appl. No.: 14/334,959

(22) Filed: Jul. 18, 2014

(65) Prior Publication Data

US 2015/0033186 A1 Jan. 29, 2015

(30) Foreign Application Priority Data

Jul. 24, 2013 (JP) ................................ 2013-154043
Jul. 31, 2013 (JP) ................................ 2013-159108
Jul. 31, 2013 (JP) ................................ 2013-159115

(51) Int. Cl.
G06F 3/0488 (2013.01)
G06F 3/0485 (2013.01)
G06F 3/0482 (2013.01)

(52) U.S. Cl.
CPC ........ G06F 3/04883 (2013.01); G06F 3/0482 (2013.01); G06F 3/0485 (2013.01)

(58) Field of Classification Search
CPC ... G06F 3/00; G06F 3/01; G06F 3/017; G06F 3/041; G06F 3/048; G06F 3/0481;
(Continued)

(56) References Cited

U.S. PATENT DOCUMENTS 7,870,508 B1 * 1/2011 Wright ................. G06F 3/0482
715/853
2005/0219207 A1 * 10/2005 Shishido ............ G01C 21/3611
345/156
(Continued)

FOREIGN PATENT DOCUMENTS

JP 2000-200143 A 7/2000
JP 2008-140377 A 6/2008
(Continued)

OTHER PUBLICATIONS

Office Action dated Apr. 26, 2016 from European Patent Office re EP Appl. No. 14176167.6.
(Continued)

*Primary Examiner* — Xiomar L Bautista
(74) *Attorney, Agent, or Firm* — McDonnell Boehnen Hulbert & Berghoff LLP

(57) ABSTRACT

A retrieval device includes: a touch panel that displays a list that arranges a data specific information piece, a retrieval character reception section that receives one or more characters of the data specific information piece for identifying data of a data group via an handwritten input to the list on the touch panel, an information retrieval section that retrieves the data specific information piece with the one or more retrieval characters, and a retrieval result display section that displays a retrieval result of the information retrieval section on the touch panel.

19 Claims, 32 Drawing Sheets

(58) Field of Classification Search
CPC .... G06F 3/0482; G06F 3/0484; G06F 3/0485;
G06F 3/0488; G06F 3/04883; G06F
1/1626; G06F 17/2247; G06F 17/30286;
G06F 17/30864; G06Q 10/10

See application file for complete search history.

(56) References Cited

U.S. PATENT DOCUMENTS

| | | | |
|---|---|---|---|
| 2007/0067272 A1* | 3/2007 | Flynt | G06F 3/0482 |
| 2009/0055771 A1* | 2/2009 | Nurmi | G06F 3/0482 715/810 |
| 2010/0146439 A1* | 6/2010 | Ariga | G06F 17/30864 715/810 |
| 2011/0202880 A1 | 8/2011 | Kawana et al. | |
| 2013/0166581 A1* | 6/2013 | Teicher | G06F 3/01 707/758 |
| 2014/0300561 A1* | 10/2014 | Waller | B60K 35/00 345/173 |

FOREIGN PATENT DOCUMENTS

| | | |
|---|---|---|
| JP | 2010-537289 A | 12/2010 |
| JP | 2011-170523 A | 9/2011 |
| WO | 2011/061582 A1 | 5/2011 |
| WO | 2013/062883 A1 | 5/2013 |

OTHER PUBLICATIONS

Screenshot of YouTube video from Internet: "Live Search with Ajax," Nov. 22, 2009, p. 1, XP054976463, URL :https://www.youtube.com/watch?v=mSAbp_4ACaw.

A better use of search engine except for Google, Net Search "the Latest", Nikkei Personal Computing, Nikkei Business Publications, Inc., Jun. 24, 2014, No. 676, pp. 47-48.

Office Action from JP 2013-154043.

Office Action from JP 2013-159108.

* cited by examiner

| ARTIST | ALBUM | SONG |
|--------|-------|------|
| Animal | Age | All |
| Animal | Age | Horse |
| Animal | Age | Young |
| Animal | Big | Cake |
| Animal | Big | Drive |
| Animal | Big | Wind |
| Attack | Afternoon | Earth |
| Attack | Afternoon | Major |
| Attack | Afternoon | Necessary |
| Attack | Afternoon | Success |
| ⋮ | ⋮ | ⋮ |

FIG. 2

| ARTIST | ALBUM | SONG |
|---|---|---|
| Kind | Apple | Breakfast |
| Kind | Apple | Phone |
| Kind | Apple | Table |
| Kind | Lemon | Notebook |
| Kind | Lemon | Orange |
| Kind | Lemon | Restaurant |
| Kindergarten | Doll | Bread |
| Kindergarten | Doll | Driver |
| Kindergarten | Doll | Zoo |
| Kindergarten | Game | Elephant |
| Kindergarten | Game | Jam |
| Kindergarten | Game | Snake |
| King | Dream | Break |
| King | Dream | Night |
| King | Dream | Star |
| Kingdom | Micro | Camera |
| Kingdom | Micro | Plane |
| Kingdom | Micro | Word |

FIG. 7

| ARTIST | ALBUM | SONG |
|---|---|---|
| Train | Dance | Breadth |
| Train | Dance | Glove |
| Train | Dance | Hair |
| Clock | Desk | Computer |
| Clock | Desk | Mouse |
| Clock | Desk | Pocket |
| Ship | Dog | Face |
| Ship | Dog | Leaf |
| Ship | Dog | People |
| Kindergarten | Doll | Bread |
| Kindergarten | Doll | Driver |
| Kindergarten | Doll | Zoo |
| Lion | Door | Breath |
| Lion | Door | Land |
| Lion | Door | Question |
| King | Dream | Break |
| King | Dream | Night |
| King | Dream | Star |

FIG. 8

| ARTIST | ALBUM | SONG |
|---|---|---|
| Capital | Football | Bread |
| Kindergarten | Doll | Bread |
| Sailor | Contest | Bread |
| Wall | Goods | Bread |
| Train | Dance | Breadth |
| Universe | Honey | Breadth |
| King | Dream | Break |
| Farmer | Jewel | Breakfast |
| Kind | Apple | Breakfast |
| Machine | Railway | Breakfast |
| Sailor | Contest | Breakfast |
| Bowl | Middle | Breath |
| Lion | Door | Breath |
| Sense | Hand | Breath |
| Zone | Cap | Breath |

FIG. 9

| ARTIST | ALBUM | SONG |
|--------|-------|------|
| Kind | Autumn | Orange |
| Kind | Autumn | Picture |
| Kind | Autumn | Tree |
| Kind | Diary | Bread |
| Kind | Diary | Breakfast |
| Kind | Diary | Table |
| King | Car | Stamp |
| King | Car | Village |

FIG. 16

| ARTIST | ALBUM | SONG |
|--------|-------|------|
| Kind | SD11 | Bread |
| Kind | SD11 | Breakfast |
| Kind | SD11 | Table |
| Just | SD12 | Stamp |
| Just | SD12 | Village |
| Still | SD10 | Picture |
| Still | SD10 | Tree |

FIG. 26

| ARTIST | ALBUM | SONG |
|---|---|---|
| Still | SD10 | Picture |
| Still | SD10 | Tree |
| Kind | SD11 | Bread |
| Kind | SD11 | Breakfast |
| Kind | SD11 | Table |
| Just | SD12 | Stamp |
| Just | SD12 | Village |

FIG. 27A

| ARTIST | ALBUM | SONG |
|---|---|---|
| . | . | . |
| . | . | . |
| . | . | . |
| Bus | MP11 | Orange |
| Attack | PT10 | Diary |
| . | . | . |
| . | . | . |
| . | . | . |

FIG. 27B

| ARTIST | ALBUM | SONG |
|---|---|---|
| . . . | . . . | . . . |
| Bus | MP11 | Orange |
| Still | SD10 | Picture |
| Still | SD10 | Tree |
| Kind | SD11 | Bread |
| Kind | SD11 | Breakfast |
| Kind | SD11 | Table |
| Just | SD12 | Stamp |
| Just | SD12 | Village |
| Attack | PT10 | Diary |
| . . . | . . . | . . . |

FIG. 28

RETRIEVAL DEVICE FOR RETRIEVING DATA SPECIFIC INFORMATION USED FOR IDENTIFYING DATA OF A DATA GROUP

REFERENCE TO RELATED APPLICATIONS

This application is based upon and claims priority to corresponding Japanese Patent Application No. 2013-154043, filed in the Japan Patent Office on Jul. 24, 2013, Japanese Patent Application No. 2013-159108, filed in the Japan Patent Office on Jul. 31, 2013, and Japanese Patent Application No. 2013-159115, filed in the Japan Patent Office on Jul. 31, 2013, the entire contents of which are incorporated herein by reference.

FIELD

The present disclosure relates to a retrieval device that retrieves data specific information used for identifying data of a data group.

BACKGROUND

A traditional retrieval device retrieves data specific information for identifying data of a data group by receiving a retrieval character by handwriting input and using the received retrieval character.

The traditional retrieval device separately displays a character reception area provided for receiving a retrieval character and an area other than the retrieval character reception area.

The traditional retrieval device displays, on a touch panel, a list in which data specific information is arranged that matches a retrieval character.

SUMMARY

A retrieval device according to an embodiment of the present disclosure includes a touch panel, a retrieval character reception section, an information retrieval section, and a retrieval result display section. The touch panel displays a list, where a data specific information piece is arranged in the list. The retrieval character reception section receives one or more retrieval characters of the data specific information piece for identifying data of a data group, where the retrieval character reception section receives the one or more retrieval characters via an handwritten input to the list on the touch panel. The information retrieval section retrieves the data specific information piece with the one or more retrieval characters. The retrieval result display section displays a retrieval result of the information retrieval section on the touch panel.

A retrieval method according to an embodiment of the present disclosure includes (i) receiving, via a retrieval character reception section, one or more retrieval characters for a data specific information piece for identifying data of a data group, (ii) retrieving, via an information retrieval section, the data specific information piece with the one or more retrieval characters, (iii) and displaying, via a retrieval result display section, a retrieval result of the information retrieval section on a touch panel, where receiving the one or more retrieval characters includes receiving the one or more retrieval characters via an handwritten input to a list on the touch panel, where the data specific information piece is arranged in the list and displayed on the touch panel.

A non-transitory, computer-readable recording medium according to an embodiment of the present disclosure stores a retrieval program that is executable by a computer. The retrieval program includes first, second, and third program codes. The first program code causes the computer to receive one or more retrieval characters for a data specific information piece for identifying data of a data group, where the computer receives the one or more retrieval characters via an handwritten input to a list on the touch panel. The second program code causes the computer to retrieve the data specific information piece with the one or more retrieval characters. The third program code causes the computer to display a retrieval result obtained by the second program code on a touch panel, where the data specific information piece is arranged and displayed on the touch panel.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

FIG. 2 shows an example list in which data specific information pieces used for identifying data of a data group illustrated in FIG. 1 are arranged;

FIG. 7 shows an example retrieval result obtained when retrieval was performed with the characters "Kin" in the hierarchical level "ARTIST" of the list illustrated in FIG. 2;

FIG. 8 shows an example retrieval result obtained when retrieval was performed with the character "D" in the hierarchical level "ALBUM" of the list illustrated in FIG. 2;

FIG. 9 shows an example retrieval result obtained when retrieval was performed with the characters "Brea" in the hierarchical level "SONG" of the list illustrated in FIG. 2;

FIG. 16 shows the mobile device illustrated in FIG. 1 in a state where a retrieval result obtained when retrieval was performed with the retrieval characters "Kin" of the hierarchical level "ARTIST" is displayed;

FIG. 26 shows an example candidate group when retrieval is performed with the retrieval characters "SD11";

FIG. 27A shows an example of the candidate group illustrated in FIG. 26 with attribute information pieces of the hierarchical level "ALBUM" arranged based on a certain rule when retrieval is performed with the retrieval characters "SD11";

FIG. 27B shows an example non-candidate group with attribute information pieces of the hierarchical level "ALBUM" arranged based on a certain rule when retrieval is performed with the retrieval characters "SD11";

FIG. 28 shows an example retrieval result list obtained when retrieval is performed with the retrieval characters "SD11";

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

A first embodiment of the present disclosure will be described with reference to the accompanying drawings.

Figure 1:
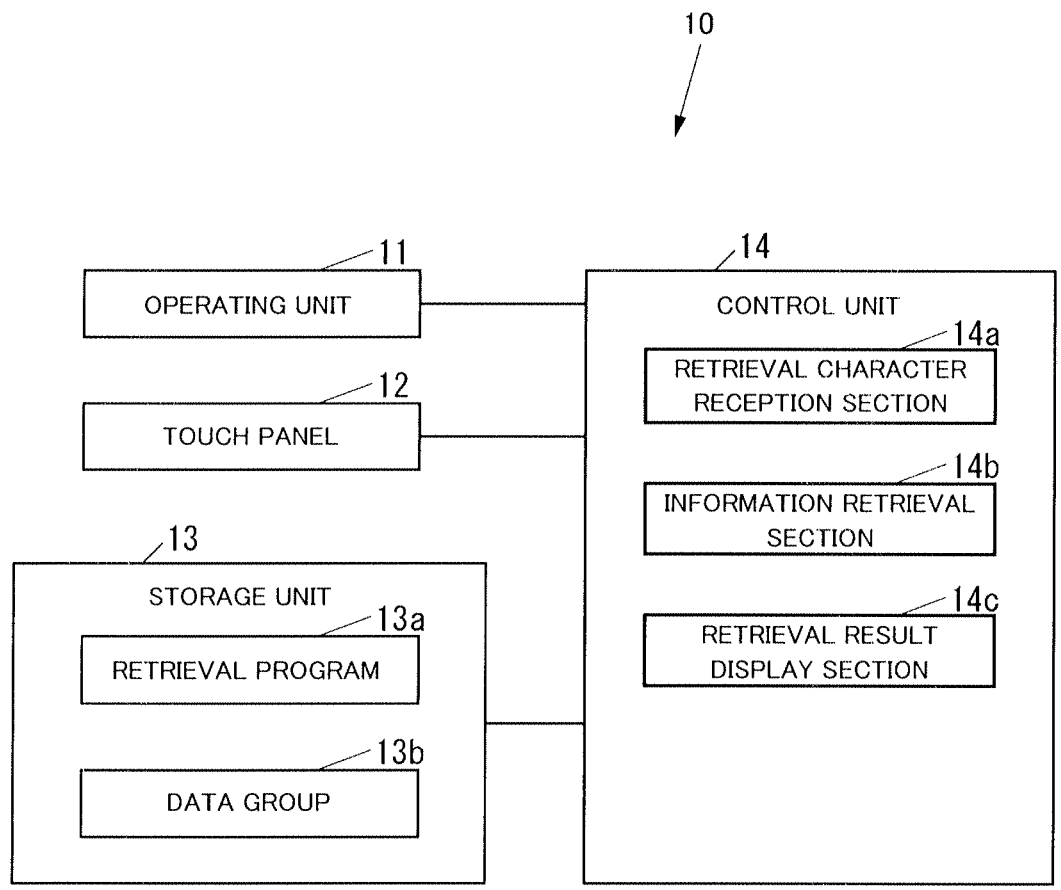
FIG. 1 shows a configuration of a mobile device according to an embodiment of the present disclosure.

A mobile device 10 according to the first embodiment has a configuration illustrated in FIG. 1.

As illustrated in FIG. 1, the mobile device 10 includes an operating unit 11, a touch panel 12, a storage unit 13, and a control unit 14. The communication unit 11 may be an input device, such as a button and the like, to which various operations may be inputs. The touch panel 12 displays various types of information and various operations are received or initiated via inputs to the touch panel 12. The storage unit 13 may be a nonvolatile memory, such as a flash memory and the like, which stores a program and various types of data. The control unit 14 controls the mobile device 10.

The mobile device 10 may be, for example, an electronic device, such as a mobile music player, a smartphone, and the like.

The storage unit 13 stores a retrieval program 13a that may be executed by the control unit 14. The retrieval program 13a may be installed in the mobile device 10 in a production stage of the mobile device 10, and may be additionally installed in the mobile device 10 via a storage medium or a network.

The storage unit 13 may store a data group 13b. The data group 13b may be installed in the mobile device 10 in a production stage of the mobile device 10, and may be additionally installed in the mobile device 10 via a storage medium or a network.

FIG. 2 shows an example list 20 in which data specific information pieces used for identifying data of the data group 13b are arranged.

In the list 20 illustrated in FIG. 2, the data specific information pieces in each row other than the heading row specify each data piece of the data group 13b. In this case, data may be a music file. The data specific information pieces of each row are represented by a hierarchical structure including a plurality of attribute information pieces. Each of attribute information pieces of the hierarchical level "ARTIST" may indicate a performer of a song corresponding to a target music file. Each of attribute information pieces of the hierarchical level "ALBUM" may indicate the name of an album in which a song corresponding to the target music file may be recorded. Each of attribute information pieces of the hierarchical level "SONG" may indicate the name of a song corresponding to the target music file. For example, data specific information pieces in the first row may be represented by the attribute information piece "Animal" of the hierarchical level "ARTIST", the attribute information piece "Age" of the hierarchical level "ALBUM", and the attribute information piece "All" of the hierarchical level "SONG". In the example illustrated in FIG. 2, the hierarchical level "ARTIST" may be the highest level, the hierarchical level "ALBUM" may belong to one level lower than the hierarchical level "ARTIST", and the hierarchical level "SONG" may belong to one level lower than the hierarchical level "ALBUM". In the list 20, attribute information pieces of the hierarchical level "ARTIST" may be arranged based on a specific rule. Attribute information pieces of the hierarchical level "ALBUM" may be arranged for each of attribute information pieces of the hierarchical level "ARTIST" based on the specific rule. Attribute information pieces of the hierarchical level "SONG" may be arranged for each of attribute information pieces of the hierarchical level "ALBUM" based on the specific rule. The term "specific rule" herein may be a rule for arranging attribute information pieces in an alphabetical order of A, B, C, . . . and Z and then in a numerical order of 0, 1, 2, . . . and 9. The higher the order of the first character of the attribute information piece is, the higher the attribute information piece may be ranked. If the order of the first character of one attribute information piece is the same as the order of the first character of another attribute information piece, one of the attribute information pieces that has the second character having a higher order may be ranked higher. Note that whether an alphabet may be in uppercase or lowercase does not affect the terms of the ordering.

The control unit 14 illustrated in FIG. 1 may include, for example, a central processing unit (CPU), a read only memory (ROM) that stores a program and various types of data, and a random access memory (RAM) possibly used as a work area of the CPU. The CPU may execute the program stored in the ROM or the storage unit 13.

The control unit 14 may execute the retrieval program 13a stored in the storage unit 13 to function as a retrieval character reception section 14a, an information retrieval section 14b, and a retrieval result display section 14c. The retrieval character reception section 14a may receive one or more retrieval characters for a data specific information piece. The information retrieval section 14b may retrieve the data specific information piece with the one or more retrieval characters received by the retrieval character reception section 14a. The retrieval result display section 14c may display a retrieval result on the touch panel 12.

Next, the operation of the mobile device 10 will be described.

Figure 3:
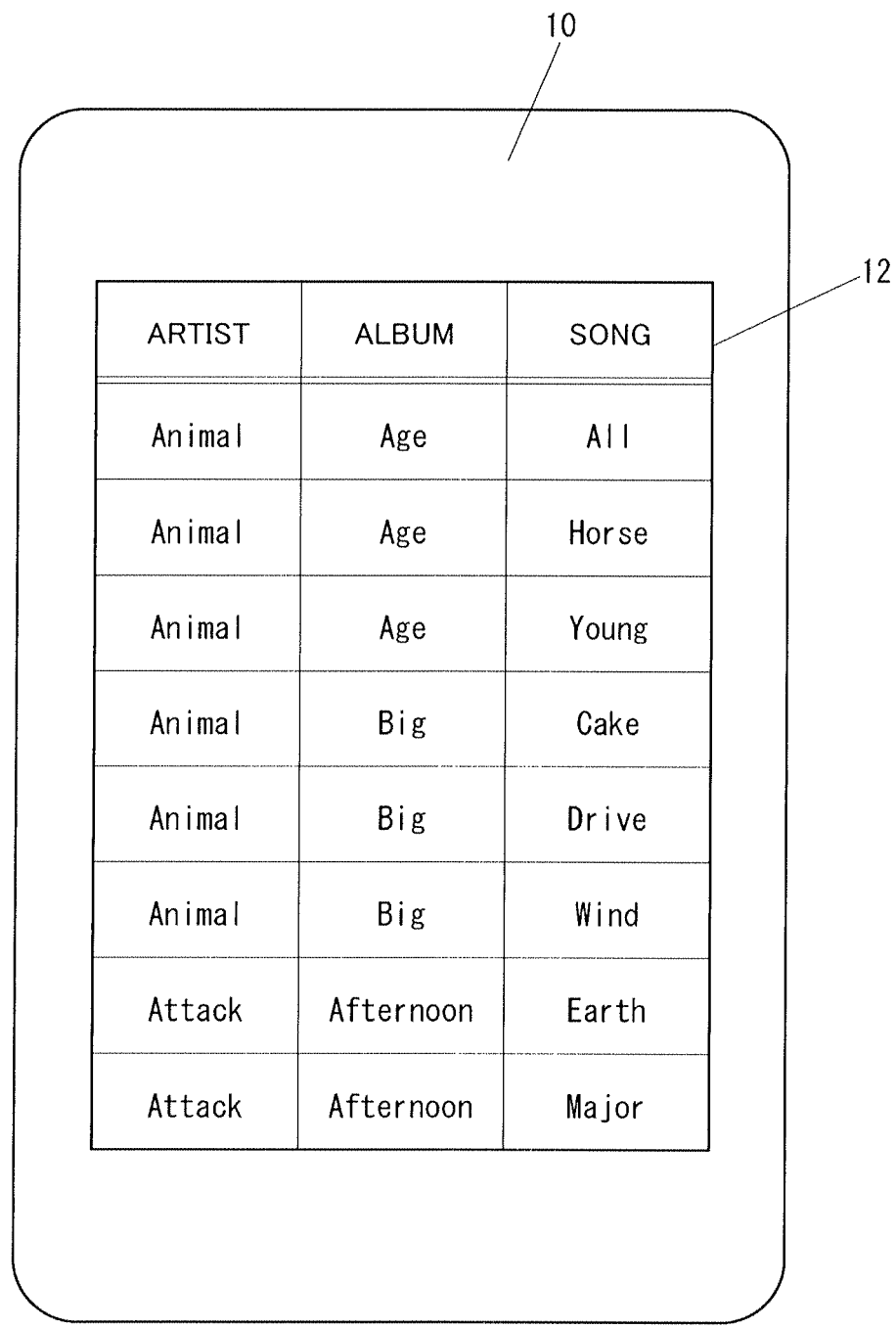
FIG. 3 shows the mobile device illustrated in FIG. 1 in a state where a part of the list is displayed on a touch panel.

FIG. 3 shows the mobile device 10 in a state where a part of the list 20 may be displayed on the touch panel 12.

Figure 4:
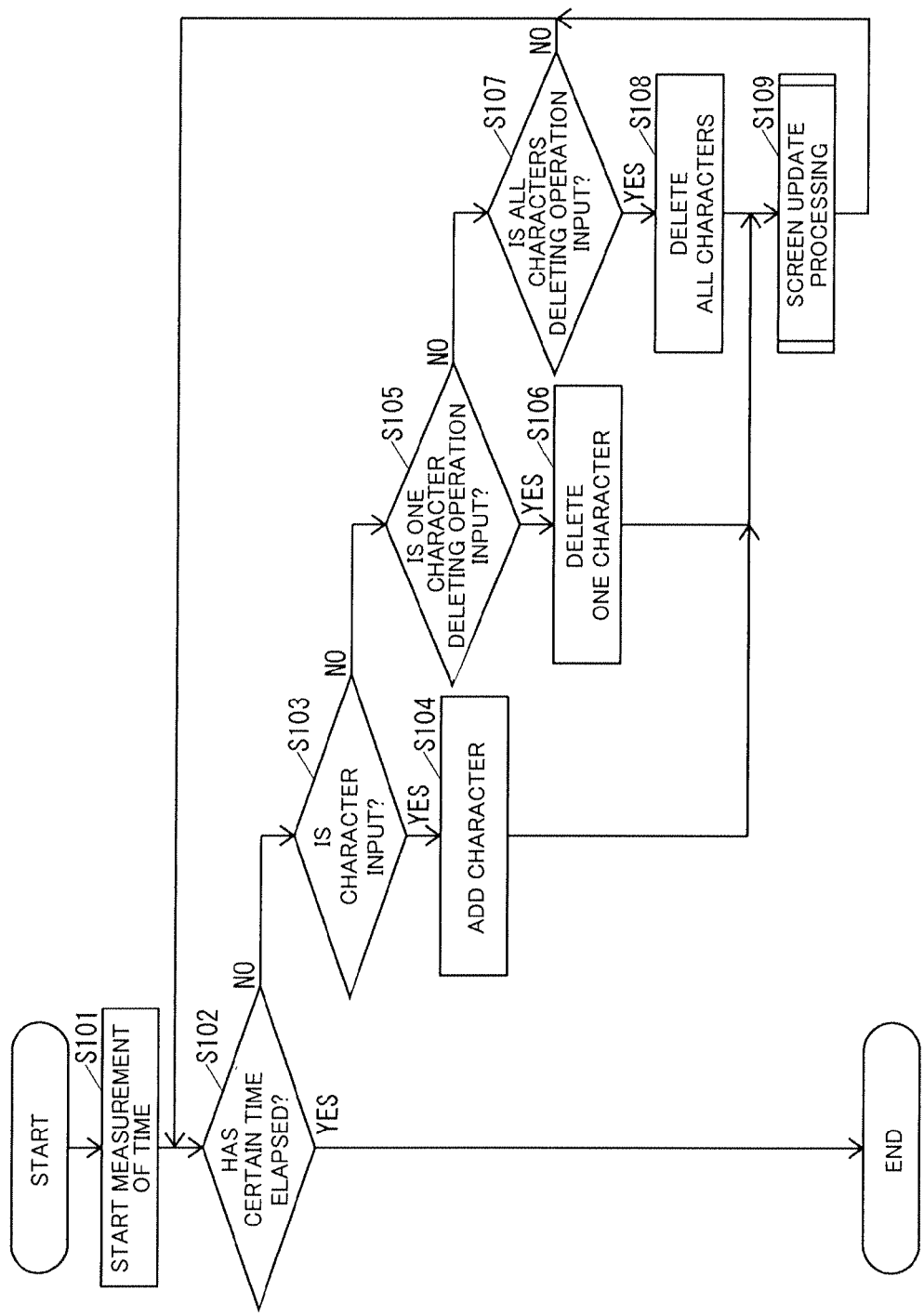
FIG. 4 shows an operation performed by the mobile device illustrated in FIG. 1 when retrieving a data specific information piece.

In the first embodiment, when a certain operation may be received or initiated via an input to the operating unit 11 while the mobile device 10 may be in the state illustrated in FIG. 3, the control unit 14 executes the operation illustrated in FIG. 4.

FIG. 4 shows an operation performed by the mobile device 10 when retrieving a data specific information piece.

As illustrated in FIG. 4, the retrieval character reception section 14a of the control unit 14 of the mobile device 10 starts a timer (also referred to herein as a "measurement of time") (S101), and then, determines whether or not a certain time has elapsed since the measurement of time was started in S101 (S102).

If the retrieval character reception section 14a determines that a certain time has not elapsed in S102, the retrieval character reception section 14a determines whether or not one or more characters received via inputs to the touch panel 12, possibly by handwriting (S103). Note that, when one character deleting operation performed for deleting the last one character from a retrieval character queue is an operation of receiving a certain character via an input to the touch panel 12, possibly by handwriting, the retrieval character reception section 14a does not perform the determination of S103 on the character. Similarly, consider an all characters deleting operation performed for deleting all of characters from a retrieval character queue. This may be an operation of receiving a certain character via an input to the touch panel 12, possibly by handwriting, where the retrieval character reception section 14a does not perform the determination of S103 on the character.

Figure 5:
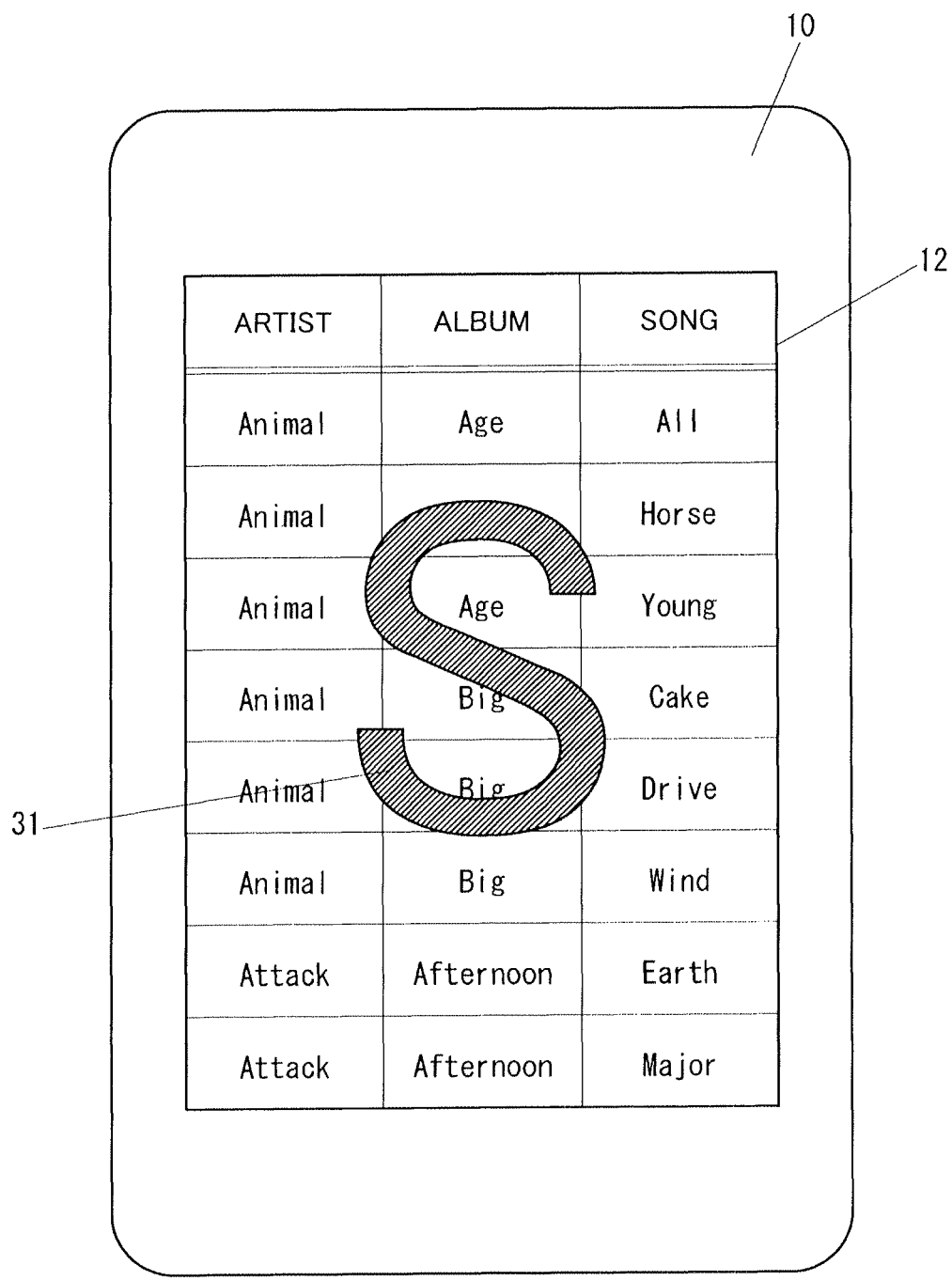
FIG. 5 shows the mobile device illustrated in FIG. 1 in a state where the character "S" is received via an input, possibly by handwriting.

FIG. 5 shows the mobile device 10 in a state where the character "S" is received via an input, possibly by handwriting.

In FIG. 5, a character 31 of hatched "S" indicates the locus of a character received via an input to the touch panel 12, possibly by handwriting, and is not actually displayed on the touch panel 12.

As illustrated in FIG. 4, if the retrieval character reception section 14a determines in S103 that one or more characters received have been input to the touch panel 12, possibly by handwriting, the retrieval character reception section 14a adds the character to the end of the retrieval character queue (S104).

If the retrieval character reception section 14a determines in S103 that one or more characters have not been received via inputs to the touch panel 12, possibly by handwriting, the retrieval character reception section 14a determines whether or not one character deleting operation is received or initiated via an input (S105). The one character deleting operation herein may be, for example, an operation in which a double slash "//" may be received or initiated via an input to the touch panel 12, possibly by handwriting.

If the retrieval character reception section 14a determines in S105 that the one character deleting operation is received or initiated via an input, the retrieval character reception section 14a deletes one character at the end of the retrieval character queue (S106).

If the retrieval character reception section 14a determines in S105 that the one character deleting operation is not received or initiated via an input, the retrieval character reception section 14a determines whether or not the all characters deleting operation may be received or initiated via an input (S107). The all characters deleting operation herein is, for example, an operation in which a double back slash "\\" or an asterisk "*" may be received via an input to the touch panel 12, possibly by handwriting.

If the retrieval character reception section 14a determines in S107 that the all characters deleting operation is received or initiated via an input, the retrieval character reception section 14a deletes all characters from the retrieval character queue (S108).

If the retrieval character reception section 14a determines in S107 that the all characters deleting operation is not received or initiated via input, the retrieval character reception section 14a executes the process of S102.

The control unit 14 executes, after the process of S104, the process of S106, or the process of S108, screen update processing (S109), which will be described later, to execute the process of S102.

If the retrieval character reception section 14a determines in S102 that the certain time has elapsed, the retrieval character reception section 14a ends the operation illustrated in FIG. 4.

Figure 6:
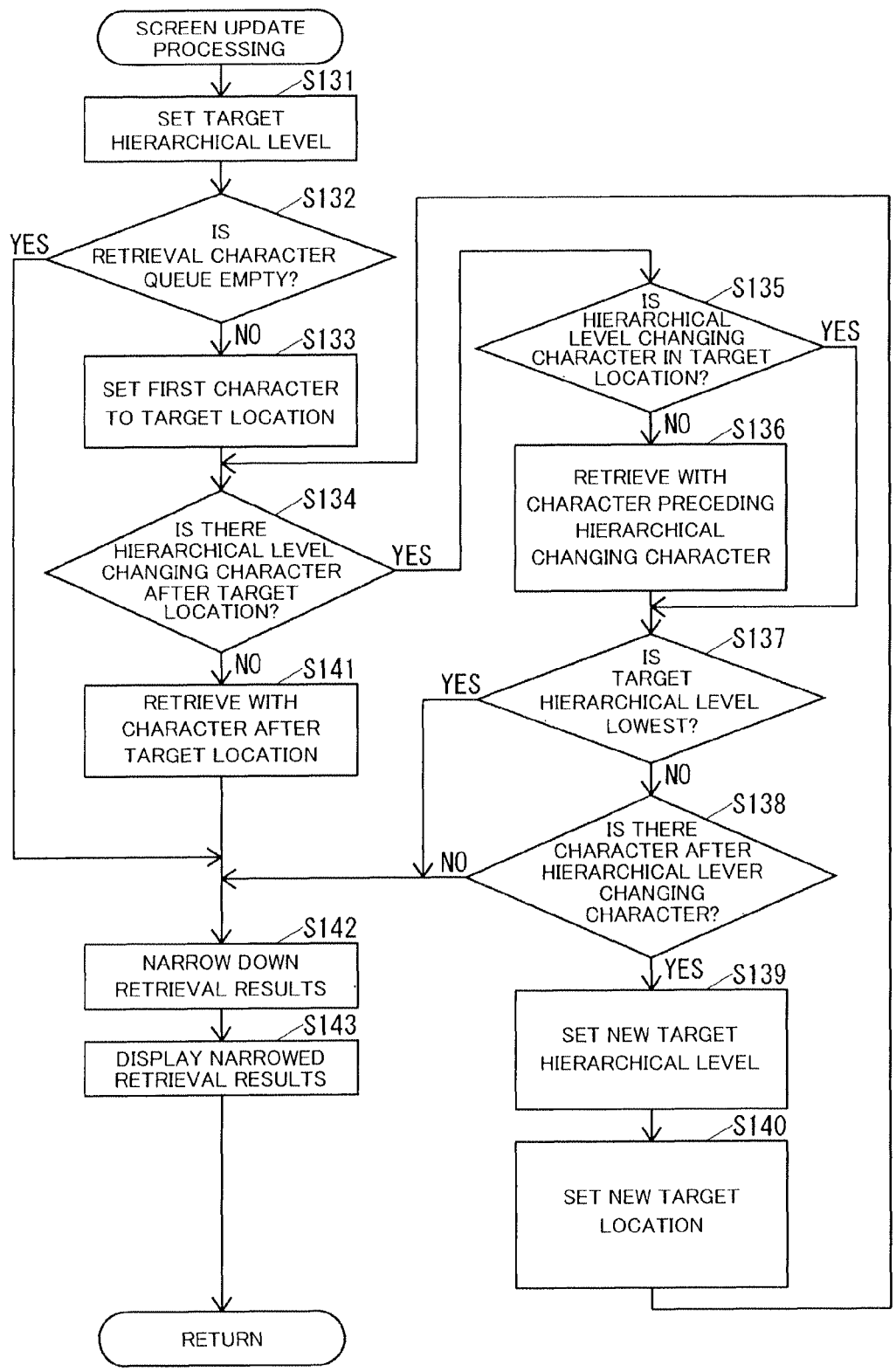
FIG. 6 shows the operation performed by the mobile device illustrated in FIG. 1 in screen update processing illustrated in FIG. 4.

FIG. 6 shows the operation of the mobile device 10 in the screen update processing illustrated in FIG. 4.

As illustrated in FIG. 6, the information retrieval section 14b of the control unit 14 may set the highest hierarchical level, that is, the hierarchical level "ARTIST", among the hierarchical levels of the data specific information pieces to a target hierarchical level (S131).

Subsequently, the information retrieval section 14b determines whether or not the retrieval character queue may be empty (S132).

If the information retrieval section 14b determines in S132 that the retrieval character queue is not empty, the information retrieval section 14b may set the location of the first character of the retrieval character queue to a target location in the retrieval character queue (S133).

Subsequently, the information retrieval section 14b determines whether or not there may be a hierarchical level changing character used for changing the hierarchical level after the target location in the retrieval character queue (S134). The hierarchical level changing character herein is, for example, an ampersand "&".

If the information retrieval section 14b determines in S134 that there may be a hierarchical level changing character used for changing the hierarchical level, the information retrieval section 14b determines whether or not a character in the target location may be the hierarchical level changing character (S135).

If the information retrieval section 14b determines in S135 that the character in the target location is not the hierarchical level changing character, the information retrieval section 14b executes retrieval in the target hierarchical level with a character preceding the hierarchical changing character located immediately after the target location in a part of the retrieval character queue located after the target location (S136).

If the information retrieval section 14b determines in S135 that the character in the target location may be the hierarchical level changing character or ends the process of S136, the information retrieval section 14b determines whether or not the target hierarchical level may be the lowest hierarchical level (S137).

If the information retrieval section 14b determines in S137 that the target hierarchical level is not the lowest hierarchical level, the information retrieval section 14b determines whether or not there is a character after the hierarchical level changing character that appears first after the target location in the retrieval character queue (S138).

If the information retrieval section 14b determines in S138 that there is a character, the information retrieval section 14b may set a hierarchical level immediately lower than the target hierarchical level to a new target hierarchical level (S139).

Subsequently, the information retrieval section 14b may set the location of the character immediately after the first hierarchical level changing character after the target location in the retrieval character queue to a new target location (S140) and executes the process of S134.

If the information retrieval section 14b determines in S134 that there is not the hierarchical level changing character, the information retrieval section 14b executes retrieval in the target hierarchical level with a character, among the characters of the retrieval character queue, which may be located after the target location (S141).

If the information retrieval section 14b determines in S132 that the retrieval character queue may be empty, if the information retrieval section 14b determines in S137 that the target hierarchical level may be the lowest hierarchical level, if the information retrieval section 14b determines in S138 that there is not a character, or if the information retrieval section 14b ends the processing, the information retrieval section 14b combines retrieval results and narrows down retrieval results (S142). That is, the information retrieval section 14b executes AND retrieval. Note that, when there is a hierarchical level for which no retrieval result is obtained, the information retrieval section 14b executes, assuming that all of the data specific information pieces of the data group 13b is retrieval results for the hierarchical level, the process of S142.

The retrieval result display section 14c of the control unit 14 displays, after the process of S142, the retrieval results narrowed down in S142 on the touch panel (S143) and ends the screen update processing illustrated in FIG. 6.

For example, when the retrieval character queue is empty, the information retrieval section 14b determines in S132 that the retrieval character queue is empty and determines that all of the data specific information pieces of the data group 13b are the retrieval results narrowed down in S142. Therefore, the retrieval result display section 14c may set all of the data specific information pieces of the data group 13b to display targets that are to be displayed on the touch panel 12 in S143. That is, the touch panel 12 may display the targets as illustrated in FIG. 3. Note that, in FIG. 3, a part of the list in which the data specific information pieces are arranged is displayed, yet the rest of the list can be displayed by scrolling the screen.

Figures 10A, 10B:
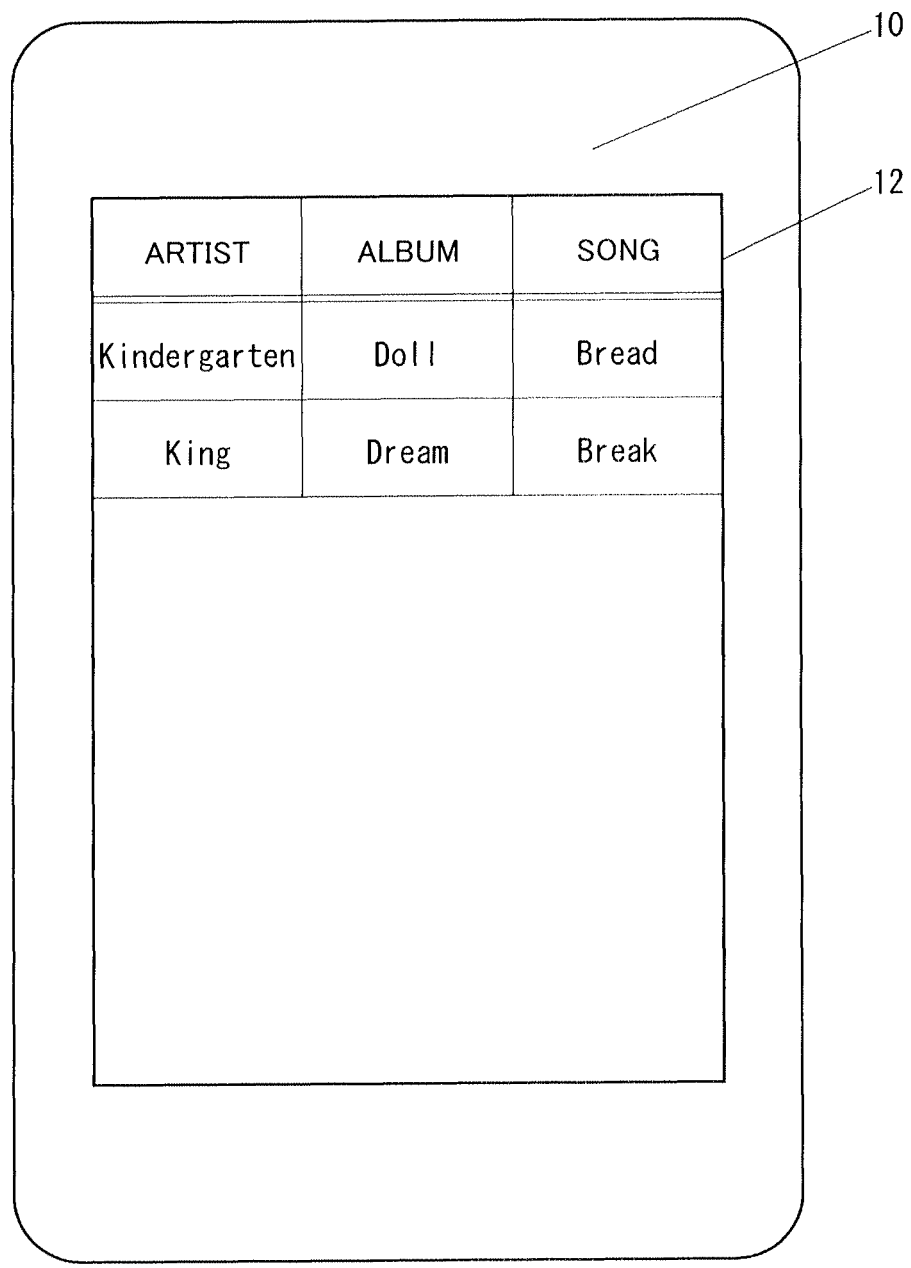
FIG. 10A shows an example retrieval result obtained when retrieval was performed with the characters "Kin" in the hierarchical level "ARTIST", the character "D" in the hierarchical level "ALBUM", and the characters "Brea" in the hierarchical level "SONG" of the list illustrated in FIG. 2.
FIG. 10B shows the mobile device illustrated in FIG. 1 in a state where the retrieval result illustrated in FIG. 10A is displayed on the touch panel.

When the characters of the retrieval character queue are "Kin&D&Brea", the information retrieval section 14b executes in S136 retrieval with the characters "Kin" in the hierarchical level "ARTIST" (see FIG. 7), executes in S136 retrieval with the character "D" in the hierarchical level "ALBUM" (see FIG. 8), executes in S141 retrieval with the characters "Brea" in the hierarchical level "SONG" (see FIG. 9), and combines the respective retrieval results of the hierarchical levels to narrow down the retrieval results in S142 (see FIG. 10A). Accordingly, as illustrated in FIG. 10B, the retrieval result display section 14c displays the data specific information pieces obtained by performing an "AND" retrieval on the data specific information pieces of the data group 13b with the retrieval characters "Kin" for the hierarchical "ARTIST", the retrieval character "D" for the hierarchical level "ALBUM", and the retrieval characters "Brea" for the hierarchical level "SONG" on the touch panel 12 in S143.

A user of the mobile device 10 can execute a certain operation, such as double tapping of one of the data specific information pieces displayed on the touch panel 12, and the like, causing the mobile device 10 to reproduce a music file identified based on the data specific information piece. Note that, when the number of data specific information pieces detected indicates one piece, the mobile device 10 can reproduce a music file identified based on the data specific information piece without waiting for an instruction of reproduction via an input of the user.

As described above, as illustrated in FIG. 5, the mobile device 10 receives one or more retrieval characters via a input to the list on the touch panel 12, possibly by handwriting in a state where the list in which the data specific information pieces are arranged is displayed on the touch panel 12 (YES in S103), and thus, even when one or more retrieval characters are received, the visibility of the list may be minimally reduced.

For example, a graphical user interface (GUI), such as a retrieval window, a retrieval button used for starting a retrieval with one or more retrieval characters received via inputs to the retrieval window, and the like, is not provided in the mobile device 10, and therefore, the user does not look for or operate the GUI, thus resulting in increase in usability for the user.

In addition, since the mobile device 10 does not include the GUI, such as a retrieval window, a retrieval button, and the like, a large display area in which information, such as the list 20 and the like, is displayed can be ensured on the touch panel 12. Specifically, when the touch panel 12 is small, it is effective ensuring on the touch panel 12 a large display area in which information, such as the list 20 and the like, is displayed.

The mobile device 10 receives one or more retrieval characters received via an input to the touch panel 12, possibly by handwriting, regardless of information, such as the list 20, and the like, displayed on the touch panel 12, and therefore, the degree of freedom of design of the screen on the touch panel 12 at the time of executing retrieval can be increased.

The mobile device 10 retrieves a data specific information piece (S136, S141, and S142) each time a single retrieval character is received in S103 (YES in S103), and displays a retrieval result on the touch panel 12 (S143) each time retrieval is executed. That is, the mobile device 10 can execute incremental search. Therefore, the mobile device 10 can simplify retrieval of data specific information pieces.

Also, the mobile device 10 can receive one or more retrieval characters for each of the hierarchical layer by a series of operations with a hierarchical level changing character used for changing the hierarchical level for which the one or more retrieval characters are received via inputs to the touch panel 12, possibly by handwriting.

For example, in a traditional retrieval method, a plurality of retrieval operations may be performed. Specifically, one or more characters may be received via an input to a retrieval window in order to retrieve a certain artist, and then, a list of albums of the artist may be displayed. Next, one or more characters may be received via an input to the retrieval window for the list to retrieve a certain album, and then, a list of songs of a particular album may be displayed. Finally, one or more characters may be received via an input to the retrieval window for the list to retrieve a certain song, and a data specific information piece corresponding to the desired song may be displayed.

In contrast, however, as described above, the mobile device 10 can receive one or more characters for each of hierarchical levels by a series of operations, and thus, enables a user to reach the desired data specific information piece by fewer operations, as compared to the traditional retrieval method.

Also, the mobile device 10 can receive one or more characters for each of hierarchical levels by a series of operations, and thus, enables a user to reach the desired data specific information piece in a short time even when the number of data pieces included in the data group 13b may be large.

Note that the mobile device 10 starts, when a certain operation may be received or initiated via an input to the operating unit 11, the operation illustrated in FIG. 4, the mobile device 10 may be configured to start the operation illustrated in FIG. 4 under a condition other than the condition where a certain operation may be received or initiated via an input to the operating unit 11. For example, the mobile device 10 may be configured to start the operation illustrated in FIG. 4 when a certain GUI displayed on the touch panel 12 may be operated, and may be configured to start the operation illustrated in FIG. 4 when the touch panel 12 is pressed and held down.

Also, in the operation illustrated in FIG. 4, the mobile device 10 ends the operation based on a certain time elapsing since the timer or measurement of time was started in S101, a reception of one or more retrieval characters. Thus, the mobile device 10 may be configured to end reception of one or more retrieval characters under a condition other than the condition where a certain time has elapsed. For example, the mobile device 10 may be configured to end the operation based on a certain operation may be received or initiated via an input to the operating unit 11, a reception of one or more retrieval characters. Further, the mobile device 10 may be configured to end the operation based on one or more retrieval characters received via the touch panel 12 that are pressed and held down. When an characters of the touch panel 12 are pressed and held down, the mobile device 10 ends reception of the one or more retrieval characters and the mobile device 10 may reproduce a music file identified based on the data specific information pieces displayed in a location on the touch panel 12 where the characters of the touch panel 12 may be pressed and held down.

Next, a second embodiment of the present disclosure will be described with reference to the accompanying drawings.

Similar to the first embodiment, a mobile device 10 according to the second embodiment includes an operating unit 11, a touch panel 12, a storage unit 13, and a control unit 14.

Figure 11:
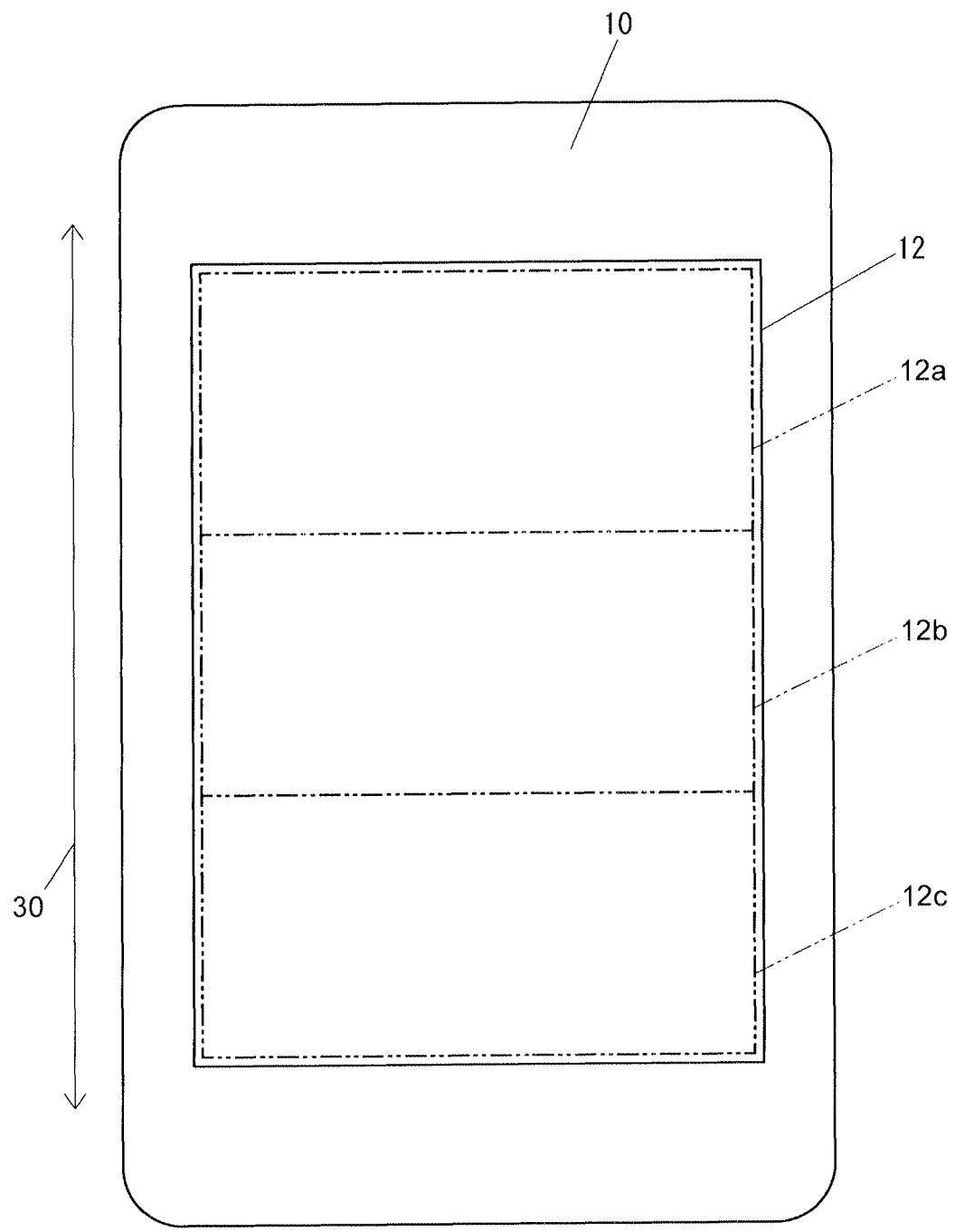
FIG. 11 shows example areas associated with hierarchical levels of data specific information pieces on the touch panel.

FIG. 11 shows example areas associated with hierarchical levels of data specific information pieces on the touch panel 12.

As illustrated in FIG. 11, the retrieval character reception section 14a associates each of three areas, i.e., an artist area 12a, an album area 12b, and a song area 12c. Further, these areas may be arranged in a direction indicated by an arrow 30 in the screen on the touch panel 12. As such, the areas may be arranged with the corresponding one of the hierarchical levels of the data specific information pieces such that the order of the areas arranged in the direction indicated by the arrow 30 may be the same as the order in terms of the hierarchical relationship between the hierarchical levels corresponding to the areas. That is, the artist area 12a, the album area 12b, and the song area 12c are associated with the hierarchical level "ARTIST", the hierarchical level "ALBUM", and the hierarchical level "SONG", respectively. Note that the artist area 12a, the album area 12b, and the song area 12c have the same length in the direction indicated by the arrow 30. In FIG. 11, a figure indicated by the alternate long and two dashes line represents an area on the touch panel 12 and may not actually be displayed on the touch panel 12.

Next, the operation of the mobile device 10 will be described.

Figure 12:
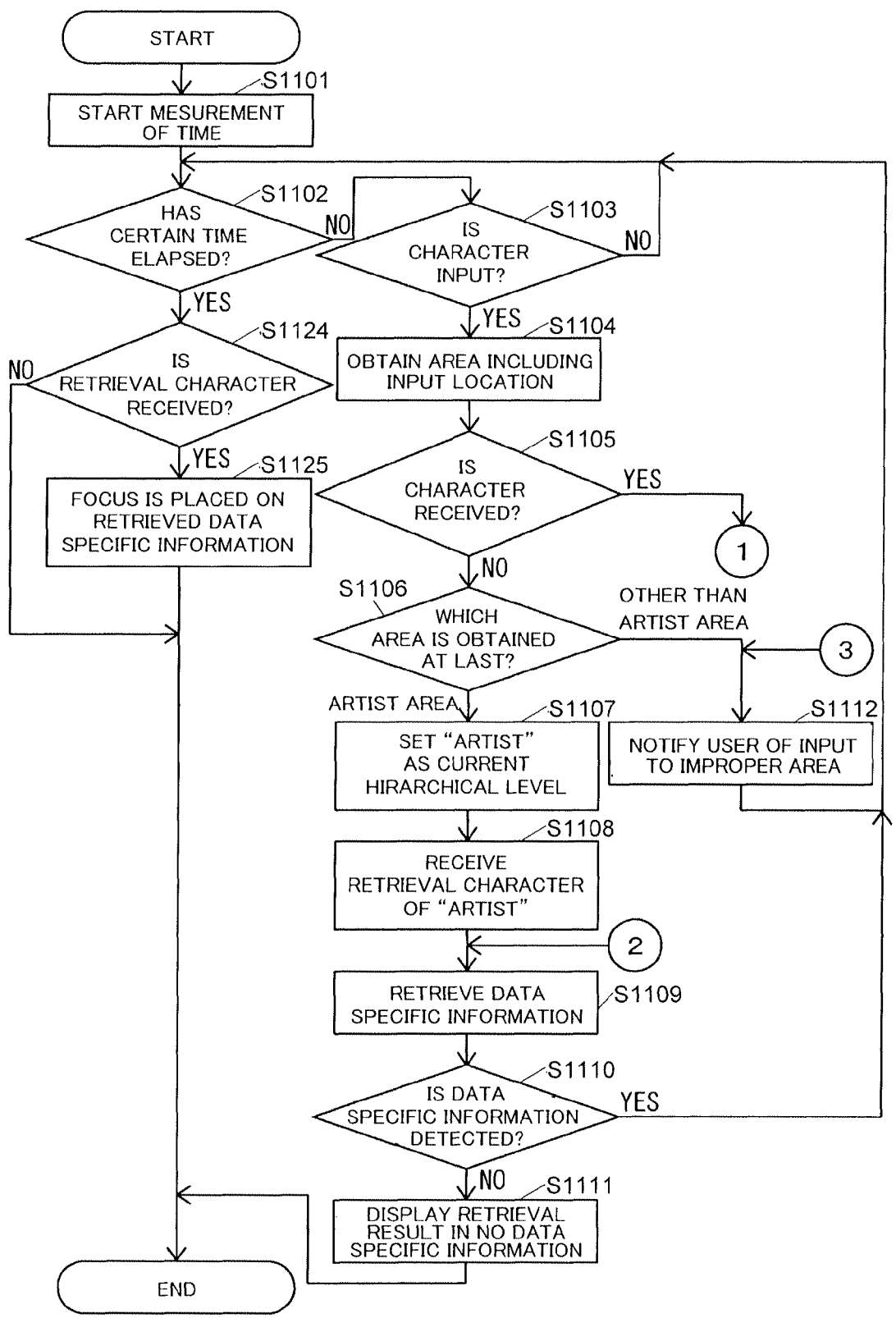
FIG. 12 shows the operation performed by the mobile device illustrated in FIG. 1 when retrieving a data specific information piece.
Figure 13:
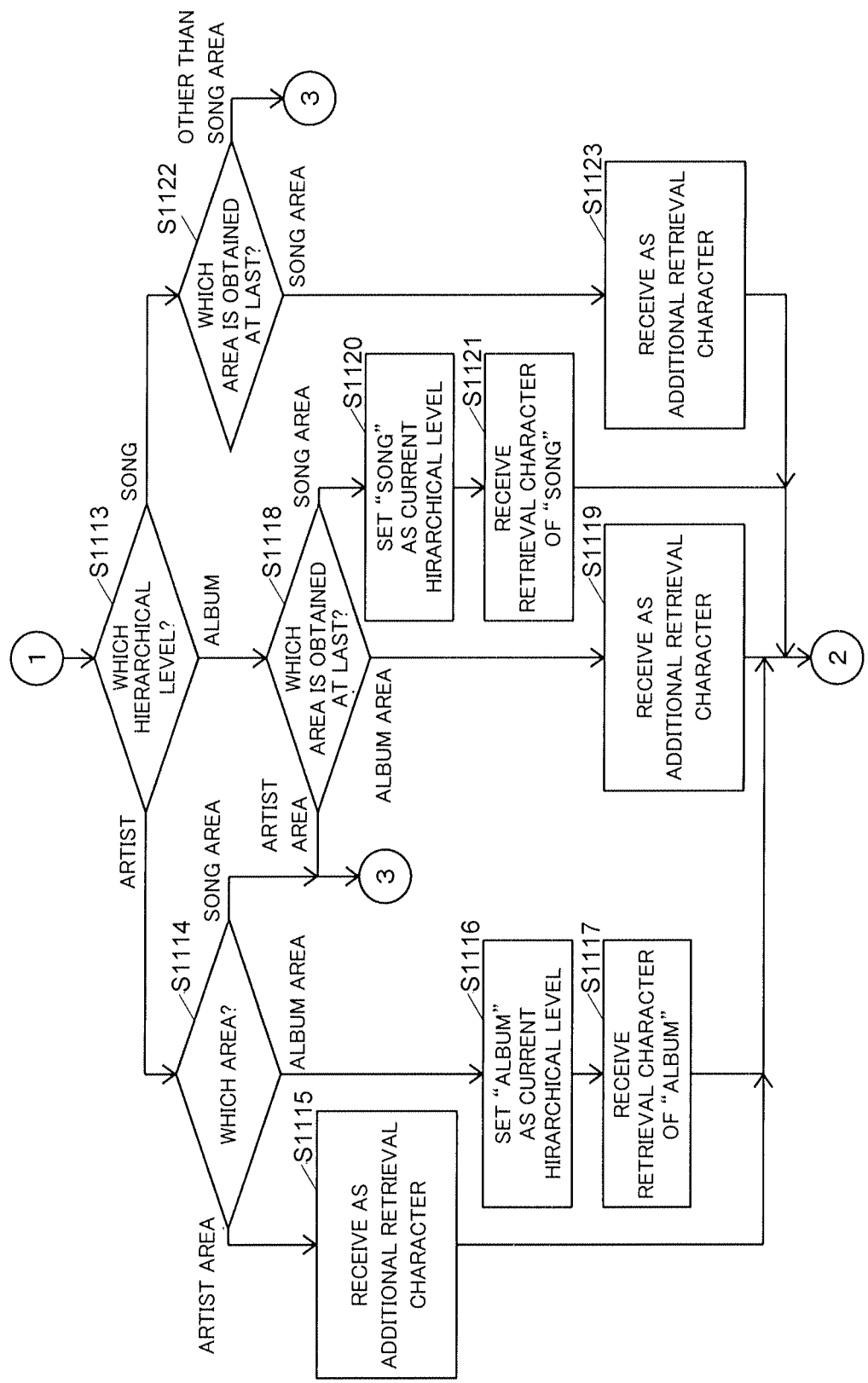
FIG. 13 shows the subsequent operation performed by the mobile device to the operation illustrated in FIG. 12.

In the second embodiment, when a certain operation is received or initiated via an input to the operating unit 11 while the mobile device 10 is in the state illustrated in FIG. 13, the control unit 14 may execute the operations illustrated in FIG. 12 and FIG. 13.

FIG. 12 shows the operation performed by the mobile device 10 when retrieving a data specific information piece.

FIG. 13 shows the subsequent operation performed by the mobile device 10 illustrated in FIG. 1 to the operation illustrated in FIG. 12.

As illustrated in FIG. 12 and FIG. 13, the retrieval character reception section 14a of the control unit 14 of the mobile device 10 starts the timer or the measurement of time (S1101), and then, determines whether or not a certain time has elapsed since the measurement of time was started in S1101 (S1102).

If the retrieval character reception section 14a determines that a certain time has not elapsed in S1102, the retrieval character reception section 14a determines whether or not one or more characters have been received via inputs to the touch panel 12, possibly by handwriting (S1103).

If the retrieval character reception section 14a determines in S1103 that one or more characters have not been received via inputs to the touch panel 12, possibly by handwriting, the retrieval character reception section 14a executes the process of S1102.

On the other hand, if the retrieval character reception section 14a determines in S1103 that one or more characters have been received via inputs to the touch panel 12, possibly by handwriting, the retrieval character reception section 14a obtains one of the artist area 12a, the album area 12b, and the song area 12c, which includes the input location of the one or more characters (S1104).

Figure 14A:
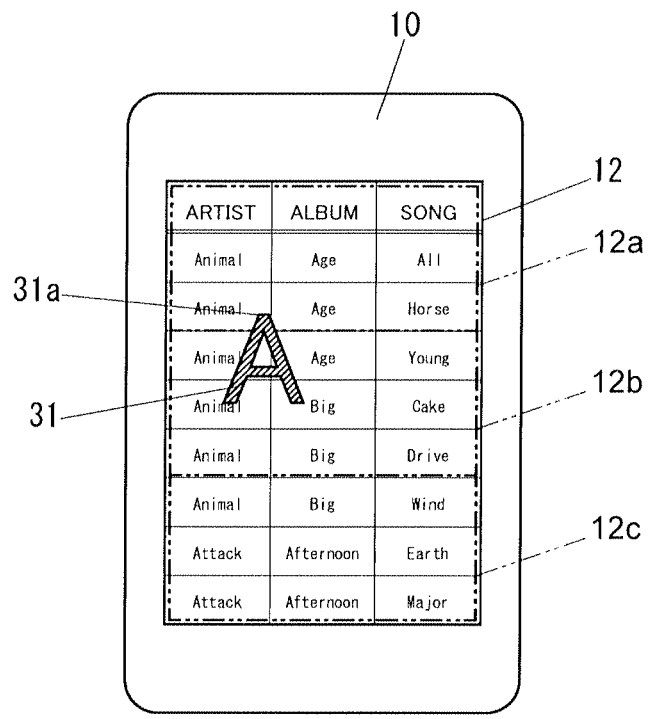
FIG. 14A shows the mobile device illustrated in FIG. 1 in a state where the character "A" is received via input, possibly by handwriting.
Figure 14B:
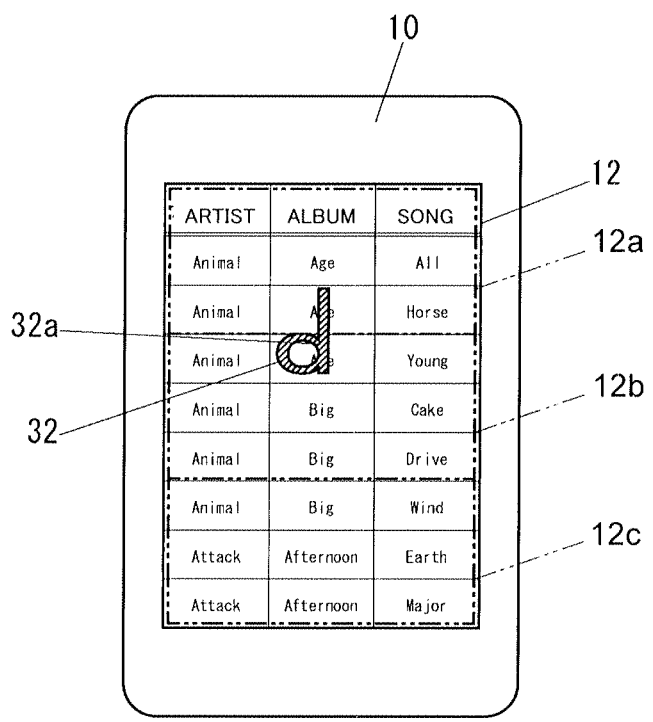
FIG. 14B shows the mobile device in a state where the character "d" is received via an input, possibly by handwriting.

FIG. 14A shows the mobile device 10 illustrated in FIG. 1 in a state where the character "A" may be received via an input, possibly by handwriting. FIG. 14B shows the mobile device 10 in a state where the character "d" may be received via an input, possibly by handwriting.

Note that, in FIG. 14A, a character 31 of hatched "A" may indicate the locus of a character received via an input to the touch panel 12, possibly by handwriting and is not actually displayed on the touch panel 12. Similarly, in FIG. 14B, a character 32 of hatched "d" may indicate the locus of a character received via an input to the touch panel 12, possibly by handwriting and is not actually displayed on the touch panel 12. Also, in FIG. 7, a figure indicated by the alternate long and two dashes line represents an area on the touch panel 12 and may not actually be displayed on the touch panel 12.

The retrieval character reception section 14a recognizes, via the input location of one or more characters, the location of the beginning of writing of the one or more characters received via inputs to the touch panel 12, possibly by handwriting. For example, in the example illustrated in FIG. 14A, the retrieval character reception section 14a recognizes, as the input location of the character 31, the location 31a of the beginning of writing of the character 31 received via an input to the touch panel 12, possibly by handwriting, and the artist area 12a may be obtained as an area including the input location of the character 31 in S1104. In the example illustrated in FIG. 14B, the retrieval character reception section 14a recognizes, as the input location of the character 32, the location 32a of the beginning of writing the character 32 received via an input to the touch panel 12 by handwriting, and the album area 12b may be obtained as an area including the input location of the character 32 in S1104.

As illustrated in FIG. 12 and FIG. 13, the retrieval character reception section 14a determines, after the process of S1104, whether or not one or more characters have been received (S1105).

If the retrieval character reception section 14a determines in S1105 that one or more characters have not been received, the retrieval character reception section 14a determines which of the artist area 12a and an area other than the artist area 12a and the area obtained in S1104 is performed last (S1106).

If the retrieval character reception section 14a determines in S1106 that the obtained areas may be the artist area 12a, the retrieval character reception section 14a may set the hierarchical level "ARTIST" as the current hierarchical level (S1107) and may receive, as the one or more retrieval characters of the hierarchical level "ARTIST", the one or more characters determined in the S1103 to be performed last have been received via inputs to the touch panel 12, possibly by handwriting (S1108).

Subsequently, the information retrieval section 14b of the control unit 14 retrieves a data specific information piece with the one or more retrieval characters received by the retrieval character reception section 14a (S1109) and determines whether or not a data specific information piece has been detected in retrieval in S1109 (S1110).

If it is determined in S1110 that a data specific information piece has been detected, the retrieval character reception section 14a executes the process of S1102.

If it is determined in S1110 that a data specific information piece has not been detected, the retrieval result display section 14c of the control unit 14 displays as a retrieval result indicating that there is no data specific information piece (S1111), and ends the operations illustrated in FIG. 12 and FIG. 13.

If the retrieval character reception section 14a determines in S1106 that the obtained area is an area other than the artist area 12a, the retrieval character reception section 14a notifies the user via the touch panel 12 that the input is an input to an improper area (S1112) and executes the process of S1102.

If the retrieval character reception section 14a determines in S1105 that one or more retrieval characters have been received, the retrieval character reception section 14a determines which of the hierarchical level "ARTIST", the hierarchical level "ALBUM", and the hierarchical level "SONG" the currently set hierarchical level is (S1113).

If the retrieval character reception section 14a determines in S1113 that the currently set hierarchical level may be the hierarchical level "ARTIST", the retrieval character reception section 14a determines which of the artist area 12a, the album area 12b, and the song area 12c the area obtained in S1104 performed last may be (S1114).

If the retrieval character reception section 14a determines in S1114 that the obtained area may be the artist area 12a, the retrieval character reception section 14a receives, as an additional retrieval character, the character determined in S1103 performed last to have been received via an input to the touch panel 12, possibly by handwriting, in a location subsequent to the current one or more retrieval characters of the hierarchical level "ARTIST"(S1115). Subsequently, the information retrieval section 14b executes the process of S1109.

If the retrieval character reception section 14a determines in S1114 that the obtained area is the album area 12b, the retrieval character reception section 14a may set the hierarchical level "ALBUM" as the current hierarchical level (S1116) and may receive, as the retrieval character of the hierarchical level "ALBUM", the character determined in S1103 performed last to have been received via an input to the touch panel 12, possibly by handwriting (S1117). Subsequently, the information retrieval section 14b may execute the process of S1109.

If the retrieval character reception section 14a determines in S1114 that the obtained area is the song area 12c, the retrieval character reception section 14a may execute the process of S1112.

If the retrieval character reception section 14a determines in S1113 that the currently set hierarchical level is the hierarchical level "ALBUM", the retrieval character reception section 14a may determine which of the artist area 12a, the album area 12b, and the song area 12c is the area obtained in S1104 performed last (S1118).

If the retrieval character reception section 14a determines in S1118 that the obtained area is the artist area 12a, the retrieval character reception section 14a may execute the process of S1112.

If the retrieval character reception section 14a determines in S1118 that the obtained area is the album area 12b, the retrieval character reception section 14a may receive, as an additional retrieval character, the one or more characters determined in S1103 performed last to have been received via an input to the touch panel 12, possibly by handwriting, in a location subsequent to the current one or more retrieval characters of the hierarchical level "ALBUM" (S1119). Subsequently, the information retrieval section 14b may execute the process of S1109.

If the retrieval character reception section 14a determines in S1118 that the obtained area is the song area 12c, the retrieval character reception section 14a may set the hierarchical level "SONG" as the current hierarchical level (S1120), and may receive, as the one or more retrieval characters of the hierarchical level "SONG", the one or more characters determined in S1103 performed last to have been received via an input to the touch panel 12, by handwriting (S1121). Subsequently, the information retrieval section 14b may execute the process of S1109.

If the retrieval character reception section 14a determines in S1113 that the currently set hierarchical level is the hierarchical level "SONG", the retrieval character reception section 14a may determine which of an area other than the song area 12c and the song area 12c is the area obtained in S1104 performed last (S1122).

If the retrieval character reception section 14a determines in S1122 that the currently set hierarchical level is an area other than the song area 12c, the retrieval character reception section 14a may execute the process of S1112.

If the retrieval character reception section 14a determines in S1122 that the currently set hierarchical level is the song area 12c, the retrieval character reception section 14a may receive, as additional one or more retrieval characters, the one or more characters determined in S1103 performed last to have been received via an input to the touch panel 12, possibly by handwriting in a location subsequent to the current one or more retrieval characters of the hierarchical level "SONG" (S1123). Subsequently, the information retrieval section 14b may execute the process of S1109.

If it is determined in S1102 that a certain time has elapsed, the retrieval result display section 14c may determine whether or not one or more retrieval characters have been received (S1124).

If the retrieval result display section 14c determines in S1124 that one or more characters have not been received, the retrieval result display section 14c may end the operations illustrated in FIG. 12 and FIG. 13.

If the retrieval result display section 14c determines in S1124 that one or more characters have been received, the retrieval result display section 14c may display the list 20 in which a focus may be placed on the data specific information pieces that have been retrieved with the one or more retrieval characters, i.e., a retrieval result of the information retrieval section 14b in S1109 performed last, on the touch panel 12 (S1125), and then, ends the operations illustrated in FIG. 12 and FIG. 13. Note that, when a plurality of data specific information pieces have been detected by the information retrieval section 14b in S1109 performed last, the retrieval result display section 14c places a focus on, among the plurality of detected data specific information pieces, the data specific information piece located at the top of the list 20 in S1125.

A user of the mobile device 10 can execute a certain operation, such as double tapping of one of the data specific information pieces on which a focus may be placed on, and the like, to cause the mobile device 10 to reproduce a music file identified based on the data specific information piece on which a focus may be placed. Note that, if the number of data specific information pieces that have been finally detected may be only one, the mobile device 10 can reproduce a music file identified based on the data specific information piece without waiting for an instruction of reproduction to be input by the user.

Next, a specific example of the operation of the mobile device 10 performed when one or more characters are received via an input only in the artist area 12a, possibly by handwriting.

Figure 15:
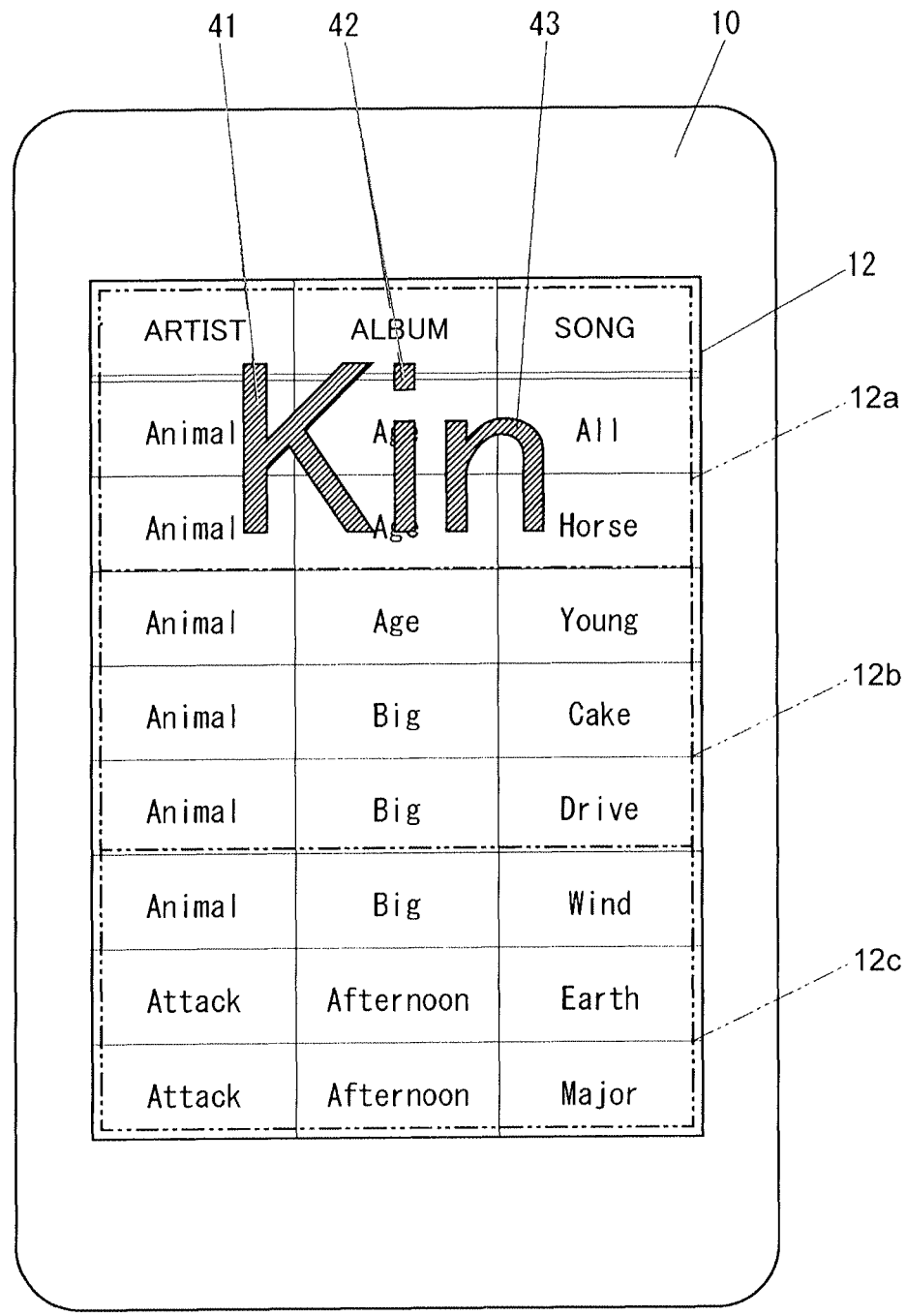
FIG. 15 shows the mobile device illustrated in FIG. 1 in a state where characters are received via an input in an artist area, possibly by handwriting.

When, in the operations illustrated in FIG. 12 and FIG. 13, for example, the characters illustrated in FIG. 15 are received via an input to the touch panel 12 in a state where the retrieval character reception section 14a waits for one or more characters to be input, the retrieval result display section 14c displays on the touch panel 12 the list where a focus may be placed on the data specific information pieces retrieved with the retrieval characters, for example, as illustrated in FIG. 16 (S1125).

FIG. 15 shows the mobile device 10 in a state where characters are received via an input in the artist area 12a, possibly by handwriting.

Note that, in FIG. 15, each of the character 41 of hatched "K", the character 42 of hatched "i", and the character 43 of hatched "n" indicates the locus of characters received via inputs to the touch panel 12, possibly by handwriting, and may be not actually displayed on the touch panel 12. Also, in FIG. 15, a figure indicated by the alternate long and two dashes line represents an area on the touch panel 12 and is not actually displayed on the touch panel 12.

The character 41, the character 42, and the character 43 illustrated in FIG. 15 are characters received via inputs to the touch panel 12 in this order, possibly by handwriting. Therefore, the retrieval character reception section 14a receives "Kin" as the retrieval characters of the hierarchical level "ARTIST".

FIG. 16 shows the mobile device 10 in a state where a retrieval result is obtained when retrieval was performed with the retrieval characters "Kin" of the hierarchical level "ARTIST" is displayed.

As illustrated in FIG. 16, as the data specific information pieces including "Kin" in the attribute information piece of the hierarchical level "ARTIST", there are a plurality of data specific information pieces including the attribute information piece "Kind" of the hierarchical level "ARTIST", a plurality of data specific information pieces including the attribute information piece "King" of the hierarchical level "ARTIST", and the like. The retrieval result display section 14c places a focus on, among the plurality of data specific information pieces, the data specific information pieces located at the top in the list 20. That is, the retrieval result display section 14c highlights the data specific information pieces represented by the attribute information piece "King" of the hierarchical level "ARTIST", the attribute information piece "Autumn" of the hierarchical level "ALBUM", and the attribute information piece "Orange" of the hierarchical level "SONG" to place a focus on the data specific information pieces.

Next, a specific example of the operation of the mobile device 10 performed when characters are received via inputs in the artist area 12a, the album area 12b, and the song area 12c, possibly by handwriting, will be described.

Figure 17:
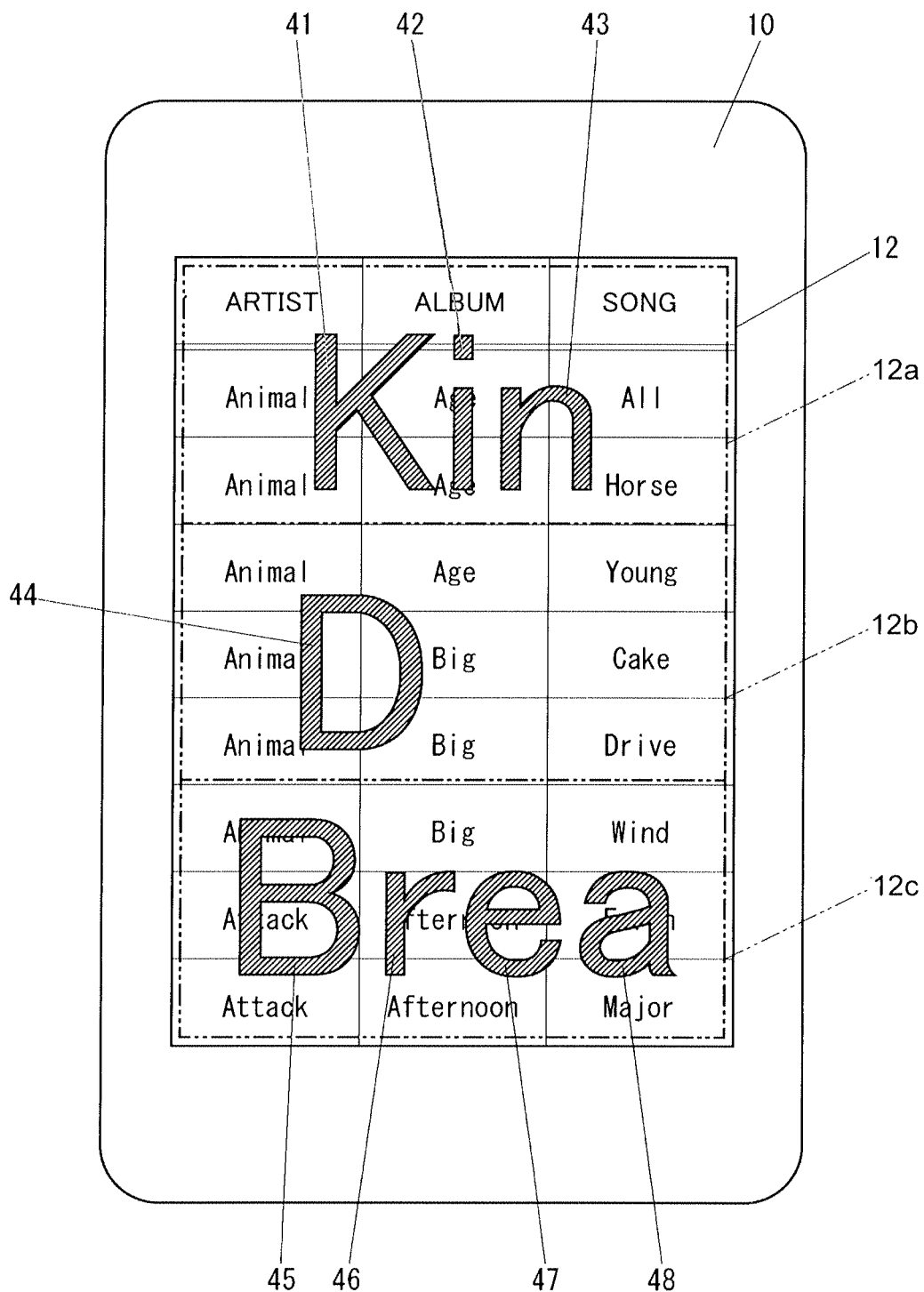
FIG. 17 shows the mobile device illustrated in FIG. 1 in a state where characters are received via an input in the artist area, an album area, and a song area, possibly by handwriting.
Figure 18:
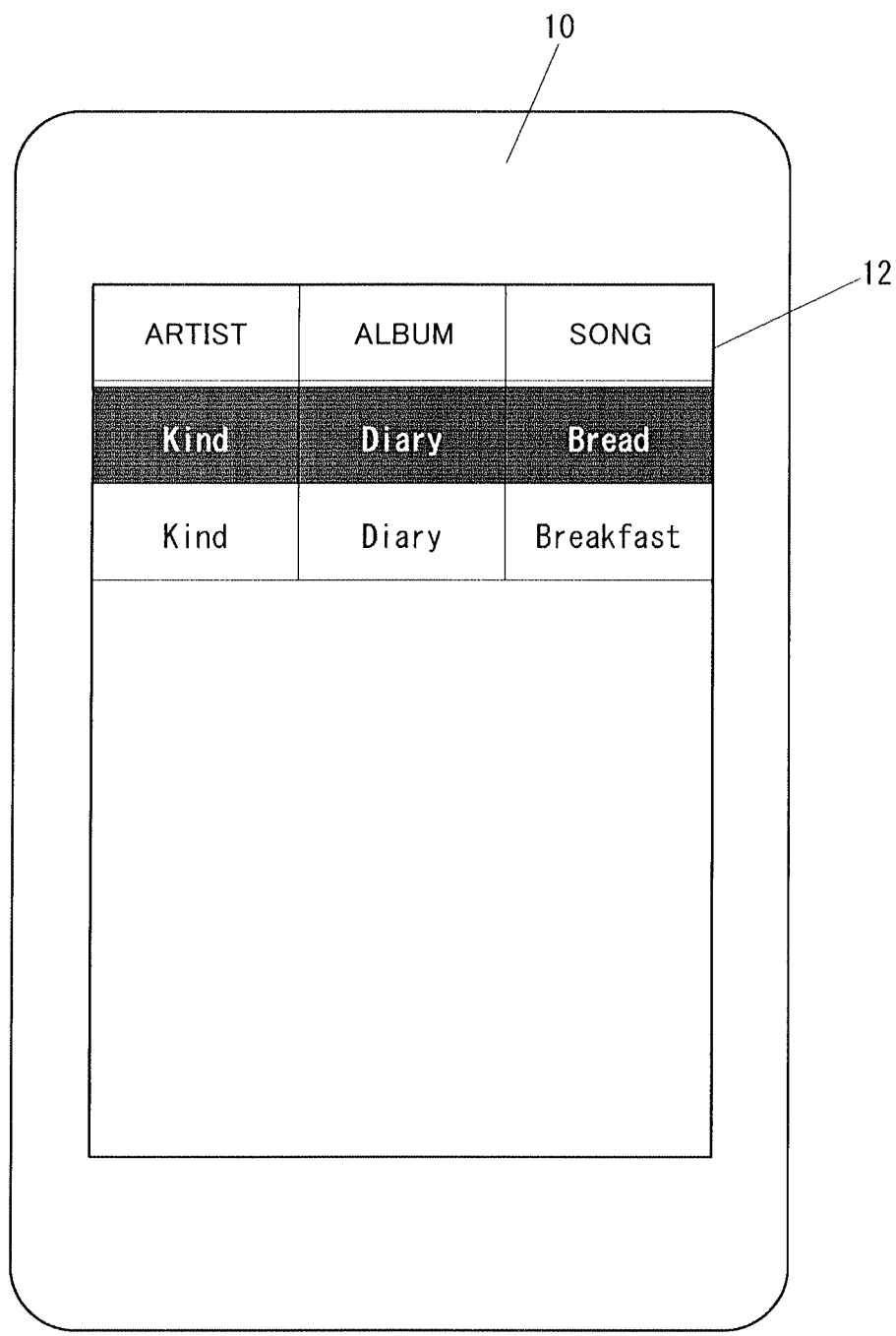
FIG. 18 shows the mobile device illustrated in FIG. 1 in a state where a retrieval result obtained when retrieval was performed with the retrieval characters "Kin" of the hierarchical level "ARTIST", the retrieval character "D" of the hierarchical level "ALBUM", and the retrieval characters "Brea" of the hierarchical level "SONG" displayed.

When, in the operations illustrated in FIG. 12 and FIG. 13, for example, the characters illustrated in FIG. 17 are received via inputs to the touch panel 12 in a state where the retrieval character reception section 14a waits for one or more characters to be input, the retrieval result display section 14c displays the list 20 where a focus may be placed on the data specific information pieces retrieved with the retrieval characters received via an input on the touch panel 12, for example, as illustrated in FIG. 18 (S1125).

FIG. 17 shows the mobile device 10 in a state where characters are received via input in the artist area 12a, the album area 12b, and the song area 12c, possibly by handwriting.

Note that, in FIG. 17, each of the character 41 of hatched "K", the character 42 of hatched "i", the character of hatched "n", the character 44 of hatched "D", the character 45 of hatched "B", the character 46 of hatched "r", the character 47 of hatched "e", and the character 48 of hatched "a" indicates the locus of each character received via inputs to the touch panel 12, possibly by handwriting, and may not actually be displayed on the touch panel 12. Also, in FIG. 17, a figure indicated by the alternate long and two dashes line represents an area on the touch panel 12 and may not actually be displayed on the touch panel 12.

The character 41, the character 42, the character 43, the character 44, the character 45, the character 46, the character 47, and the character 48 are characters received via inputs to the touch panel 12 in this order, possibly by handwriting. Accordingly, the retrieval character reception section 14a receives "Kin" as the retrieval characters of the hierarchical level "ARTIST", "D" as the retrieval character of the hierarchical level "ALBUM, and "Brea" as the retrieval characters of the hierarchical level "SONG".

FIG. 18 shows the mobile device 10 in a state where a retrieval result obtained when retrieval was performed with the characters "Kin" of the hierarchical level "ARTIST", the character "D" of the hierarchical level "ALBUM", and the characters "Brea" of the hierarchical level "SONG" may be displayed.

As illustrated in FIG. 18, as the data specific information pieces including "Kin" in the attribute information piece of the hierarchical level "ARTIST", "D" in the attribute information piece of the hierarchical level "ALBUM", and "Brea" in the attribute information piece of the hierarchical level "SONG", there are the data specific information pieces represented by the attribute information piece "Kind" of the hierarchical level "ARTIST", the attribute information piece "Diary" of the hierarchical level "ALBUM", the attribute information piece "Bread" of the hierarchical level "SONG", the data specific information pieces represented by the attribute information piece "Kind" of the hierarchical level "ARTIST", the attribute information piece "Diary" of the hierarchical level "ALBUM", the attribute information piece "Breakfast" of the hierarchical level "SONG", and the like. The retrieval result display section 14c places a focus on, among the plurality of data specific information pieces, the data specific information pieces located at the top in the list 20. That is, the retrieval result display section 14c highlights the data specific information pieces represented by the attribute information piece "Kind" of the hierarchical level "ARTIST", the attribute information piece "Dairy" of the hierarchical level "ALBUM", and the attribute information piece "Bread" of the hierarchical level "SONG" to place a focus on the data specific information pieces.

As described above, the mobile device 10 receives one or more characters received via an input to the touch panel 12, possibly by handwriting, as the one or more retrieval characters of the hierarchical level corresponding to the input location of the one or more characters on the touch panel 12 (S1108, S1115, S1117, S1119, S1121, and S1123) and thus can receive one or more retrieval characters corresponding to each of the hierarchical levels by a series of operations, thereby allowing simplification of operations performed for retrieving a data specific information piece represented by a hierarchical structure including a plurality of attribute information pieces.

For example, in a traditional retrieval method, a plurality of retrieval operations may be performed. Specifically, one or more characters are received via an input to retrieve a certain artist, and a list of albums of the artist may be displayed. Next, one or more retrieval characters are input to the retrieval window for the list to retrieve a certain album, and a list of songs of the album may be displayed. Finally, one or more retrieval characters are input to the retrieval window for the list to retrieve a certain song, and a data specific information piece corresponding to the desired song may be displayed.

In contrast, however, as described above, the mobile device 10 can receive one or more characters for each of hierarchical levels by a series of operations, and thus, the mobile device 10 may enable a user to reach the desired data specific information piece by fewer operations, as compared to the traditional retrieval method.

Also, the mobile device 10 can receive one or more characters for each of hierarchical levels by a series of operations, and thus, enables a user to reach the desired data specific information piece in a short time even when the number of data pieces included in the data group 13b may be large.

In addition, the mobile device 10 does not include a graphical user interface (GUI), such as a retrieval window, a retrieval button used for starting retrieval with one or more characters input in the retrieval window, and the like, and therefore, the user does not look for or operate the GUI, thus resulting in increase in usability for the user.

Also, since the mobile device 10 does not include the GUI, such as a retrieval window, a retrieval button, and the like, a large display area in which information, such as the list 20 and the like, may be displayed can be ensured on the touch panel 12. Specifically, when the touch panel 12 may be small, it may be effective ensuring on the touch panel 12 a large display area in which information, such as the list 20 and the like, may be displayed.

Also, the mobile device 10 may receive one or more characters via inputs to the touch panel 12, possibly by handwriting, regardless of information, such as the list 20 and the like, displayed on the touch panel 12, and therefore, the degree of freedom of design of the screen on the touch panel 12 at the time of executing retrieval can be increased.

The mobile device 10 can receive one or more retrieval characters corresponding to each of hierarchical levels in a descending order from the highest hierarchical level to the lowest hierarchical level with characters sequentially input to the three areas arranged in the direction indicated by the arrow 30 in the screen on the touch panel 12 from the artist area 12a provided at one end to the song area 12c provided at the other end, and thus, an intuitive operation may be performed as an operation performed for retrieving a data specific information piece.

Specifically, in the mobile device 10, the direction indicated by the arrow 30 may be the vertical direction of the screen on the touch panel 12, and thus, a further more intuitive operation may be performed for retrieving a data specific information piece.

Figure 19:
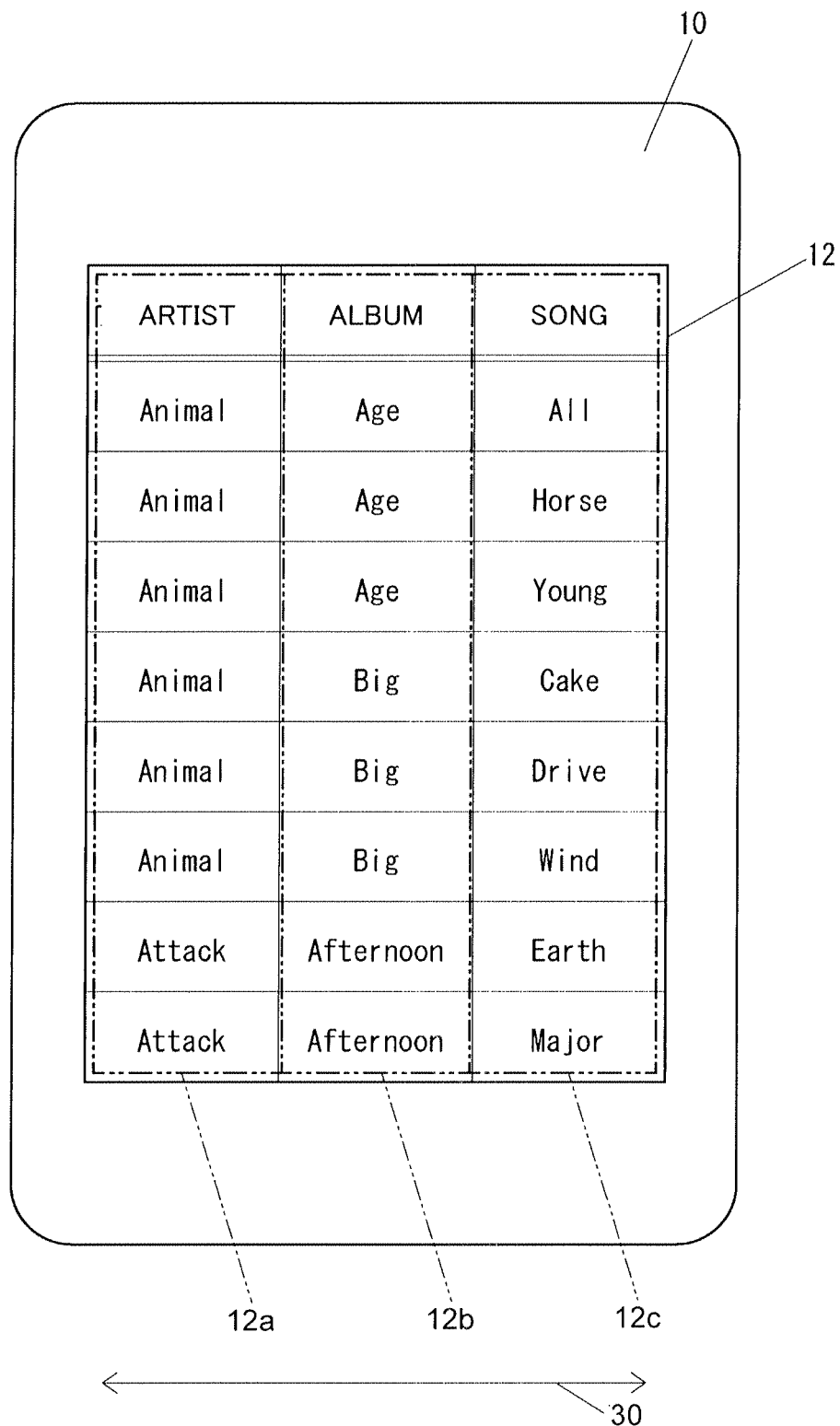
FIG. 19 shows example areas of the touch panel associated with the hierarchical levels of data specific information pieces.

Note that, in the mobile device 10, the direction indicated by the arrow 30 may be a direction other than the vertical direction of the screen on the touch panel 12. For example, as illustrated in FIG. 19, in the mobile device 10 the direction indicated by the arrow 30 may be the horizontal direction of the screen on the touch panel 12.

Also, in the mobile device 10, data specific information pieces are represented by a hierarchical structure including three attribute information pieces, but may be represented by a hierarchical structure including a plurality of attribute information pieces other than three. Even when, in the mobile device 10, data specific information pieces are represented by a hierarchical structure including a plurality of attribute information pieces other than three, areas as many as the number of hierarchical levels of data specific information pieces may be provided on the touch panel 12.

Note that although the mobile device 10 starts, when a certain operation may be received or initiated via an input to the operating unit 11, the operations illustrated in FIG. 12 and FIG. 13, the mobile device 10 may be configured to start under a condition other than the condition where the certain operation may be received or initiated via an input to the operating unit 11. For example, the mobile device 10 may be configured to start, when a certain GUI illustrated on the touch panel 12 may be operated, the operations illustrated in FIG. 12 and FIG. 13, and may be configured to start, when the touch panel 12 may be pressed and held down, the operations illustrated in FIG. 12 and FIG. 13.

Although, in the operations illustrated in FIG. 12 and FIG. 13, the mobile device 10 ends, when a certain time has elapsed since measurement of time was started in S1101, reception of one or more retrieval characters, the mobile device 10 may be configured to end reception of one or more retrieval characters under a condition other than the condition where a certain time has elapsed. For example, the mobile device 10 may be configured to end, when a certain operation may be received or initiated via an input to the operating unit 11, reception of one or more retrieval characters, and may be configured to end, when the touch panel 12 may be pressed and held down, reception of one or more retrieval characters. When the touch panel 12 may be pressed and held down, and then, the mobile device 10 ends reception of one or more retrieval characters, the mobile device 10 may reproduce, a music file identified based on the data specific information piece displayed in a location on the touch panel 12 where the touch panel 12 may be pressed and held down.

In the mobile device 10, at the time when reception of one or more retrieval characters is ended (YES in S1102), a focus may be placed on the data specific information pieces retrieved with the one or more retrieval characters (S1125), but the mobile device 10 may be configured such that a retrieval result of the information retrieval section 14b in S1109 performed last may be displayed on the touch panel 12 each time a data specific information piece may be retrieved with the one or more retrieval characters received by the retrieval character reception section 14a (S1109). That is, the mobile device 10 may be configured to execute incremental search.

Next, a third embodiment of the present disclosure will be described with reference to the accompanying drawings.

Figure 20:
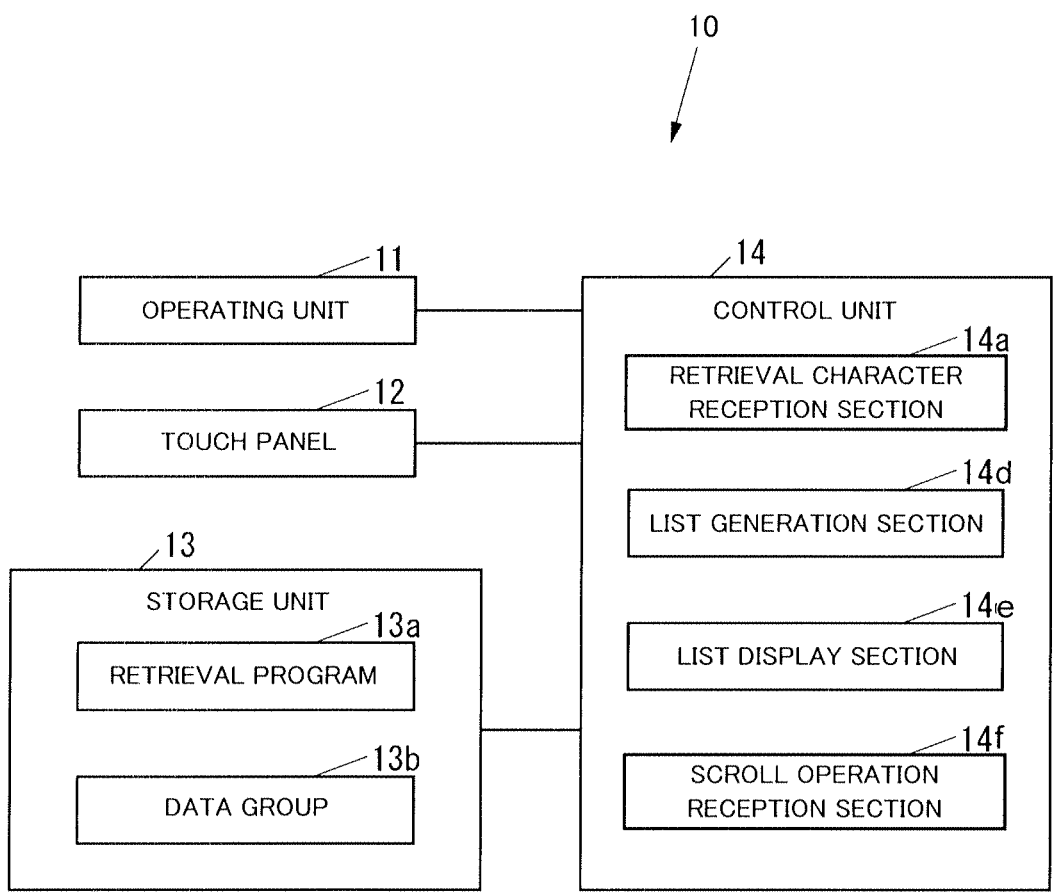
FIG. 20 shows a configuration of a mobile device according to another embodiment of the present disclosure.

A mobile device 10 according to the third embodiment has the configuration illustrated in FIG. 20.

As illustrated in FIG. 20, similar to the first embodiment, the mobile device 10 includes an operating unit 11, a touch panel 12, a storage unit 13, and a control unit 14.

The control unit 14 executes the retrieval program 13a stored in the storage unit 13 to function as the retrieval character reception section 14a, a list generation section 14d, a list display section 14e, a scroll operation reception section 14f. The retrieval character reception section 14a receives one or more retrieval characters for a data specific information piece. The list generation section 14d may be an embodiment of the information retrieval section and may be configured to retrieve a data specific information piece with the one or more retrieval characters received by the retrieval character reception section 14a and generate a retrieval result list in which the data specific information pieces are arranged based on the degree of commonality with the one or more retrieval characters. The list display section 14e may be an embodiment of the retrieval result display section and may be configured to display the retrieval result list generated by the list generation section 14d on the touch panel 12. The scroll operation reception section 14f may receive on the touch panel a scroll operation for the retrieval result list displayed by the list display section 14e.

Figure 21:
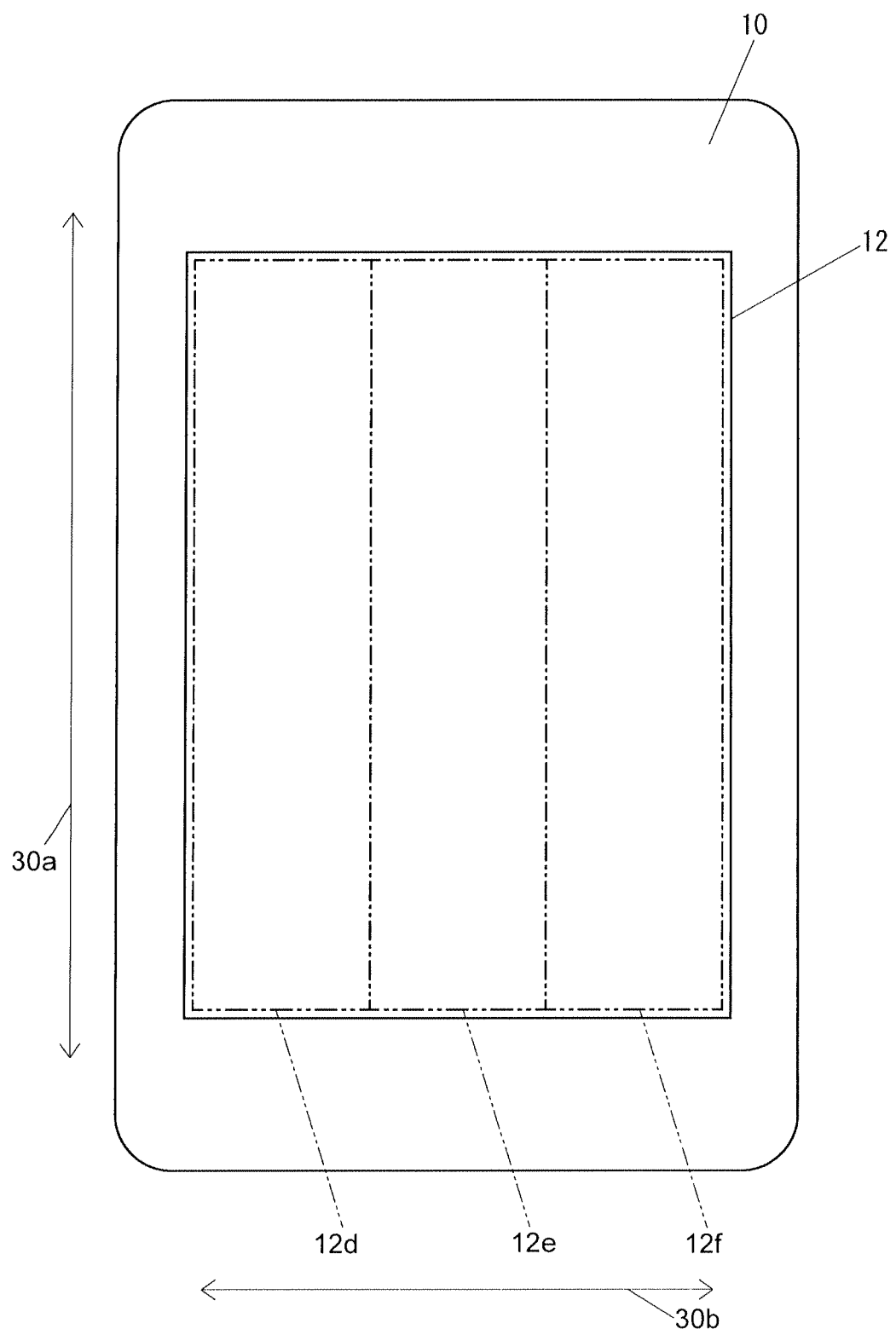
FIG. 21 shows three areas located on a touch panel.

FIG. 21 shows three areas located on the touch panel 12.

As illustrated in FIG. 21, when receiving a scroll operation for a retrieval result list, the scroll operation reception section 14f determines in which of the three areas, that is, a left area 12d, a center area 12e, and a right area 12f, arranged in the direction indicated by an arrow 30b that intersects with the scroll direction indicated by the arrow 30a in retrieval result list on the touch panel 12 a scroll operation for the retrieval result list has been input. Note that the left area 12d, the center area 12e, and the right area 12f have the same length in the direction indicated by the arrow 30b. In FIG. 21, a figure indicated by the alternate long and two dashes line represents an area on the touch panel 12 and may be not actually displayed on the touch panel 12.

Next, the operation of the mobile device 10 will be described.

First, the operation of the mobile device 10 performed when retrieving a data specific information piece will be described.

Figure 22:
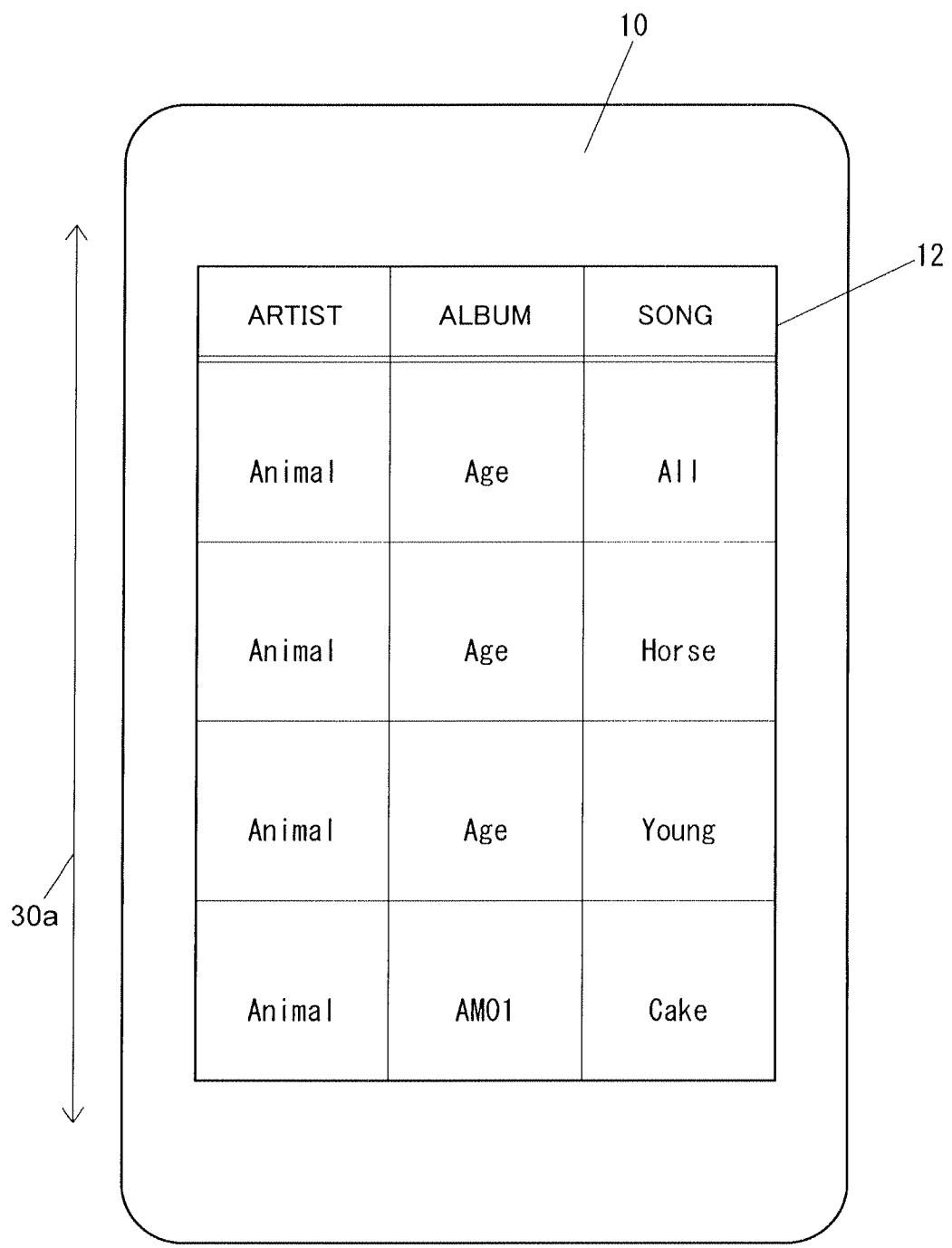
FIG. 22 shows the mobile device illustrated in FIG. 20 in a state where a part of a list is displayed on the touch panel.

FIG. 22 shows the mobile device 10 in a state where a part of a list 20 may be displayed on the touch panel 12.

Figure 23:
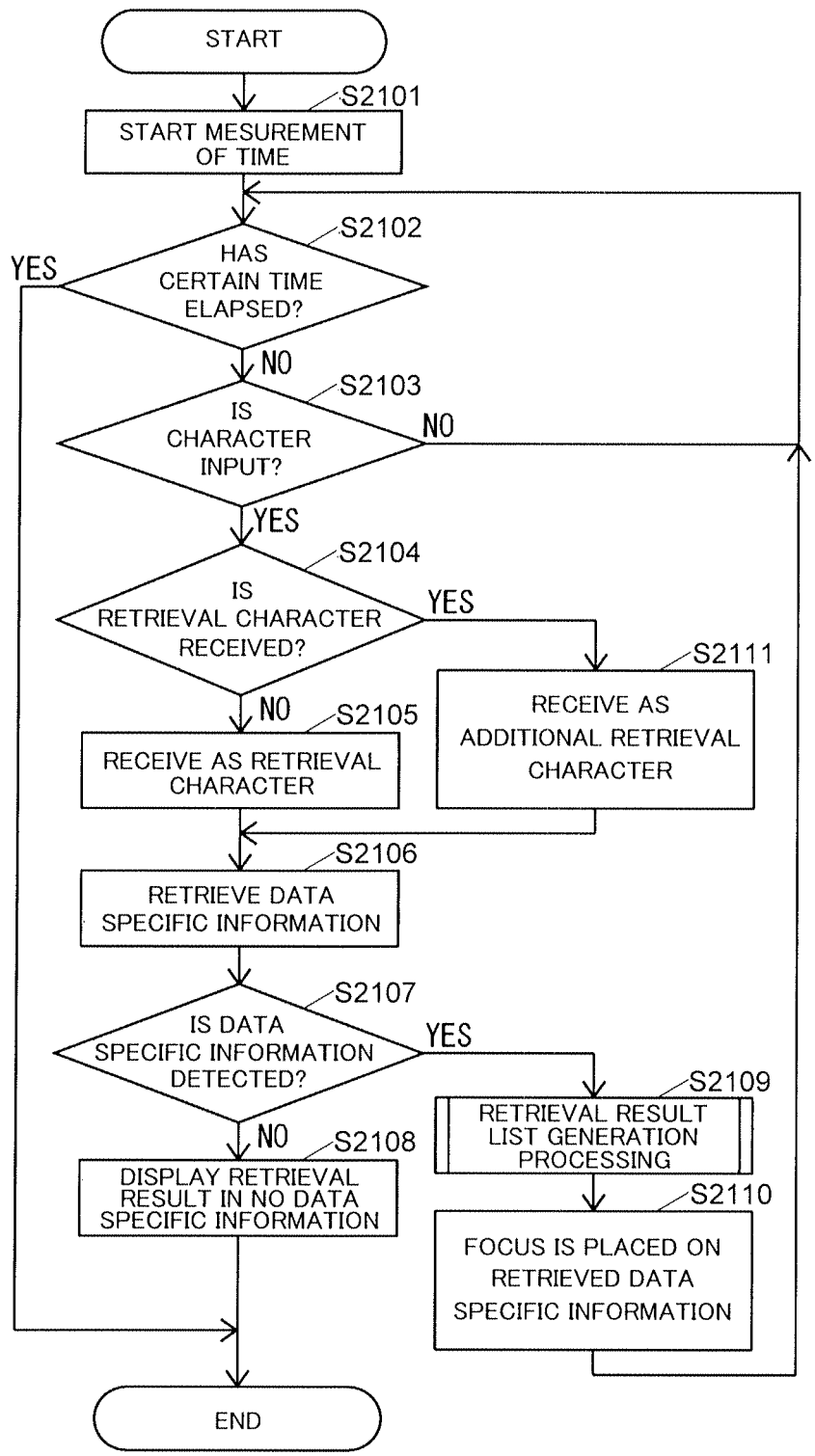
FIG. 23 shows the operation performed by the mobile device illustrated in FIG. 20 when retrieving a data specific information piece.

When a certain operation for retrieving data specific information pieces for the hierarchical level "ALBUM" is input to the operating unit 11 while the mobile device 10 is in a state illustrated in FIG. 22, the control unit 14 may execute the operation illustrated in FIG. 23.

FIG. 23 shows the operation performed by the mobile device 10 when retrieving a data specific information piece.

As illustrated in FIG. 23, the retrieval character reception section 14a of the control unit 14 of the mobile device 10 starts measurement of time (S2101), and then, determines whether or not a certain time has elapsed since the measurement of time was started in S2101 (S2102).

If the retrieval character reception section 14a determines in S2102 that a certain time has not elapsed, the retrieval character reception section 14a may determine whether or not one or more characters have been received via inputs to the touch panel 12, possibly by handwriting (S2103).

Figure 24:
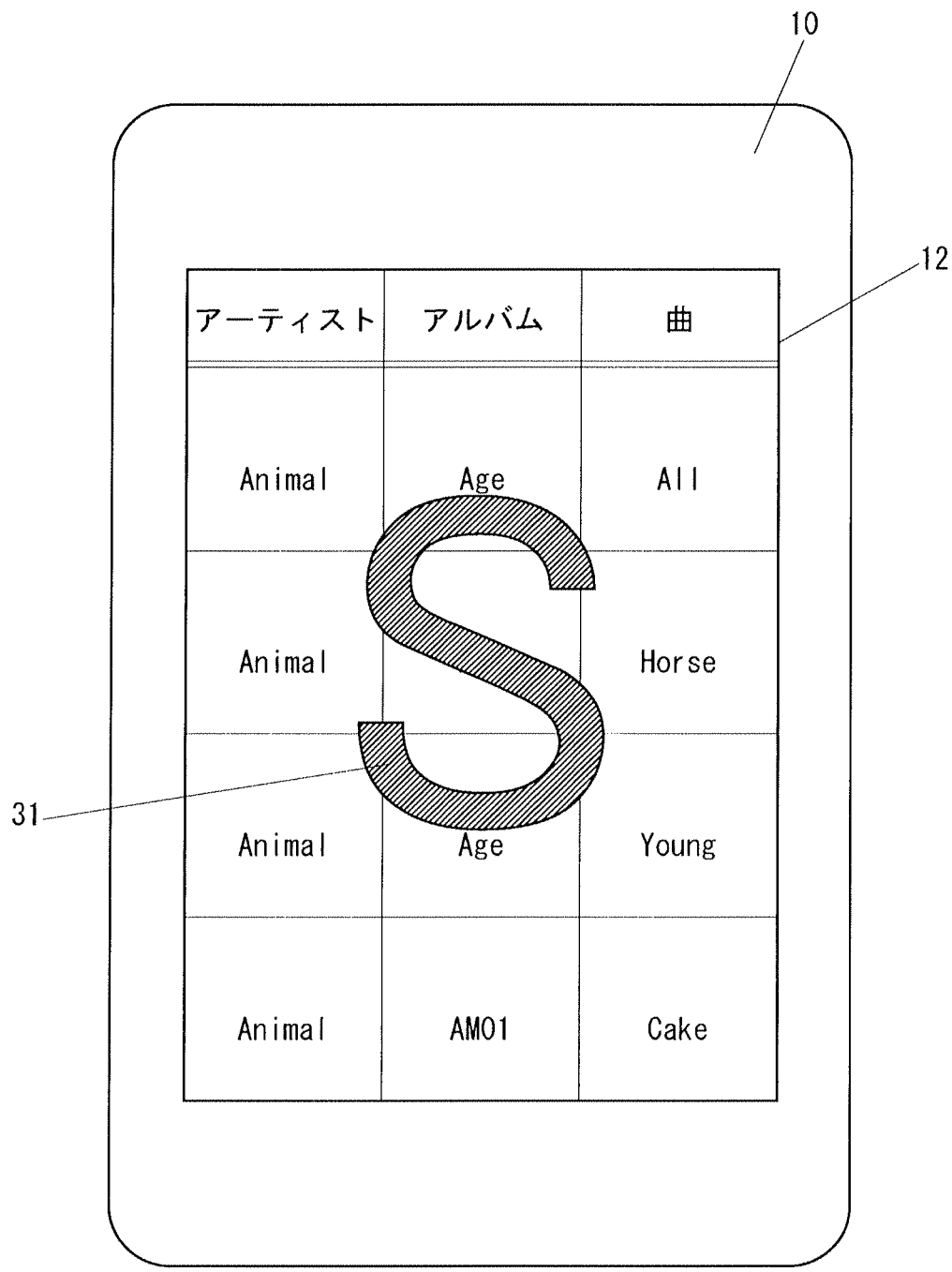
FIG. 24 shows the mobile device illustrated in FIG. 20 in a state where the character "S" is received via an input, possibly by handwriting.

FIG. 24 shows the mobile device 10 in a state where the character "S" is received via an input, possibly by handwriting.

In FIG. 24, a character 31 of hatched "S" indicates the locus of the character received via an input to the touch panel 12, possibly by handwriting, and is not actually displayed on the touch panel 12.

As illustrated in FIG. 23, if the retrieval character reception section 14a determines in S2103 that one or more characters have not been received via an input to the touch panel 12, possibly by handwriting, the retrieval character reception section 14a may execute the process of S2102.

On the other hand, if the retrieval character reception section 14a determines in S2103 that one or more characters have been received via an input to the touch panel 12, possibly by handwriting, the retrieval character reception section 14a may determine whether or not one or more retrieval characters have been received (S2104).

If the retrieval character reception section 14a determines in S2104 that one or more characters have not been received, the retrieval character reception section 14a may receive, as one or more retrieval characters, the one or more characters determined in S2103 performed last to have been received via an input to the touch panel 12, possibly by handwriting (S2105).

Subsequently, the list generation section 14d of the control unit 14 may retrieve a data specific information piece with the one or more retrieval characters received by the retrieval character reception section 14a (S2106), and may determine whether or not a data specific information piece has been detected in retrieval performed in S2106 (S2107).

If it is determined in S2107 that a data specific information piece has not been detected, the list display section 14e of the control unit 14 may display as a retrieval result that there is no data specific information piece on the touch panel 12 (S2108), and may end the operation illustrated in FIG. 23.

If the list generation section 14d determines in S2107 that data specific information pieces has been detected, the list generation section 14d may execute retrieval result list generation processing, which will be described later (S2109).

Subsequently, the list display section 14e of the control unit 14 may display on the touch panel 12 the retrieval result list generated in S2109 in a state where a focus may be placed on the data specific information piece retrieved with the current one or more retrieval characters (S2110). The retrieval character reception section 14a may execute, after the process of S2110, the process of S2102.

If the retrieval character reception section 14a determines in S2104 that one or more retrieval characters have been received, the retrieval character reception section 14a receives, as additional one or more retrieval characters, the one or more characters determined in S1103 performed last to have been received via an input to the touch panel 12, possibly by handwriting, in the end of the current one or more retrieval characters (S2111). The list generation section 14d may execute, after the process of S2111, the process of S2106.

If the retrieval character reception section 14a determines in S2102 that a certain time has elapsed, the retrieval character reception section 14a may end the operation illustrated in FIG. 23.

Figure 25:
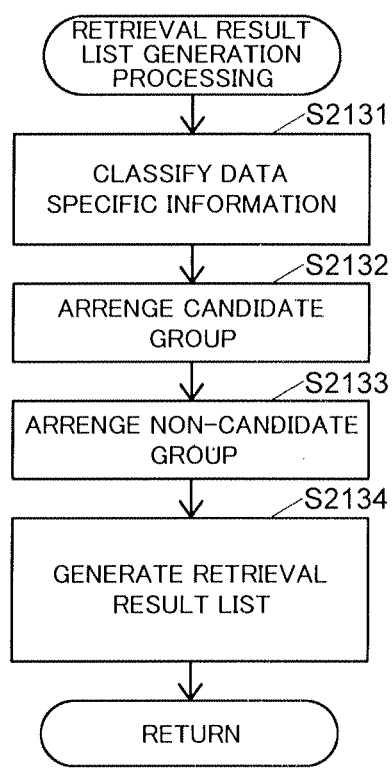
FIG. 25 shows the operation performed by the mobile device illustrated in FIG. 20 in retrieval result list generation processing illustrated in FIG. 23.

FIG. 25 shows the operation performed by the mobile device 10 in retrieval result list generation processing illustrated in FIG. 23.

As illustrated in FIG. 25, the list generation section 14d classifies data specific information pieces in the data group 13b into a candidate group that may be a collection of data specific information pieces that are highly likely to be a target of retrieval performed by a user and a non-candidate group that may be a collection of data specific information pieces that are not included in the candidate group (S2131). In this case, the list generation section 14d may generate the candidate group of data specific information pieces including all of current one or more retrieval characters in the attribute information piece of the hierarchical level "ALBUM" and data specific information pieces. The data specific information pieces may not include all of the current one or more retrieval characters in the attribute information piece of the hierarchical level "ALBUM" and may have the first two characters of the attribute information piece of the hierarchical level "ALBUM" that are the same as the first two characters of the current retrieval characters.

FIG. 26 shows an example candidate group when retrieval is performed with retrieval characters "SD11".

Data specific information pieces in the first row to the third row of the candidate group illustrated in FIG. 26 are data specific information pieces, among the data specific information pieces of the data group 13b, which include all of the current retrieval characters "SD11" in the attribute information piece of the hierarchical level "ALBUM". The data specific information pieces in the fourth row to the seventh row are data specific information pieces, among the data specific information pieces of the data group 13b, which have first two characters of the attribute information piece of the hierarchical level "ALBUM" that are the same as the first two characters, that is, "SD", of the current retrieval characters "SD11".

As illustrated in FIG. 25, the list generation section 14d arranges, after the process of S2131, the data specific information pieces of the candidate group generated in S2131 in a state where attribute information pieces of the hierarchical level "ALBUM" are arranged based on the certain rule described above (S2132). Further, the list generation section 14d arranges the data specific information pieces of the non-candidate group generated in S2131 in a state where attribute information pieces of the hierarchical level "ALBUM" are arranged based on the certain rule described above (S2133).

FIG. 27A shows an example of the candidate group with attribute information pieces of the hierarchical level "ALBUM" arranged based on a certain rule when retrieval may be performed with the retrieval characters "SD11". FIG. 27B shows an example non-candidate group with attribute information pieces of the hierarchical level "ALBUM" arranged based on a certain rule when retrieval may be performed with the retrieval characters "SD11".

In the candidate group illustrated in FIG. 27A, the candidate group illustrated in FIG. 26 may be arranged based on the certain rule described above. That is, in the data specific information pieces of the candidate group illustrated in FIG. 27A, the first three characters "SD1" of the attribute information piece of the hierarchical level "ALBUM" are the same, and therefore, the data specific information pieces are arranged based on the order of "0", "1", and "2", which are the fourth characters of the attribute information pieces of the hierarchical level "ALBUM". Similar to the candidate group illustrated in FIG. 27A, as for the non-candidate group illustrated in FIG. 27B, the data specific information pieces are arranged in a state where attribute information pieces of the hierarchical level "ALBUM" are arranged based on the certain rule described above.

As illustrated in FIG. 25, the list generation section 14d generates, after the process of S2133, a retrieval result list by arranging the candidate group with the data specific information pieces arranged based on a certain rule in S2132 in a certain location in the non-candidate group with the data specific information pieces arranged based on a certain rule in S2133 (S2134), and ends the retrieval result list generation processing illustrated in FIG. 25. In this case, the certain location may be a location where the current one or more retrieval characters are to be arranged for the non-candidate group arranged based on the certain rule described above in S2132 for each of attribute information pieces of the hierarchical level "ALBUM".

FIG. 28 shows an example retrieval result list 50 obtained when retrieval may be performed with the retrieval characters "SD11".

The retrieval result list 50 illustrated in FIG. 28 may be obtained by arranging the candidate group illustrated in FIG. 27A in the non-candidate group illustrated in FIG. 27B. In this case, the location where the candidate group illustrated in FIG. 27A may be arranged in the non-candidate group illustrated in FIG. 27B may be a location where the retrieval characters "SD11" are to be arranged based on the certain rule described above for each of attribute information pieces of the hierarchical level "ALBUM" for the non-candidate group illustrated in FIG. 27B.

Figure 29:
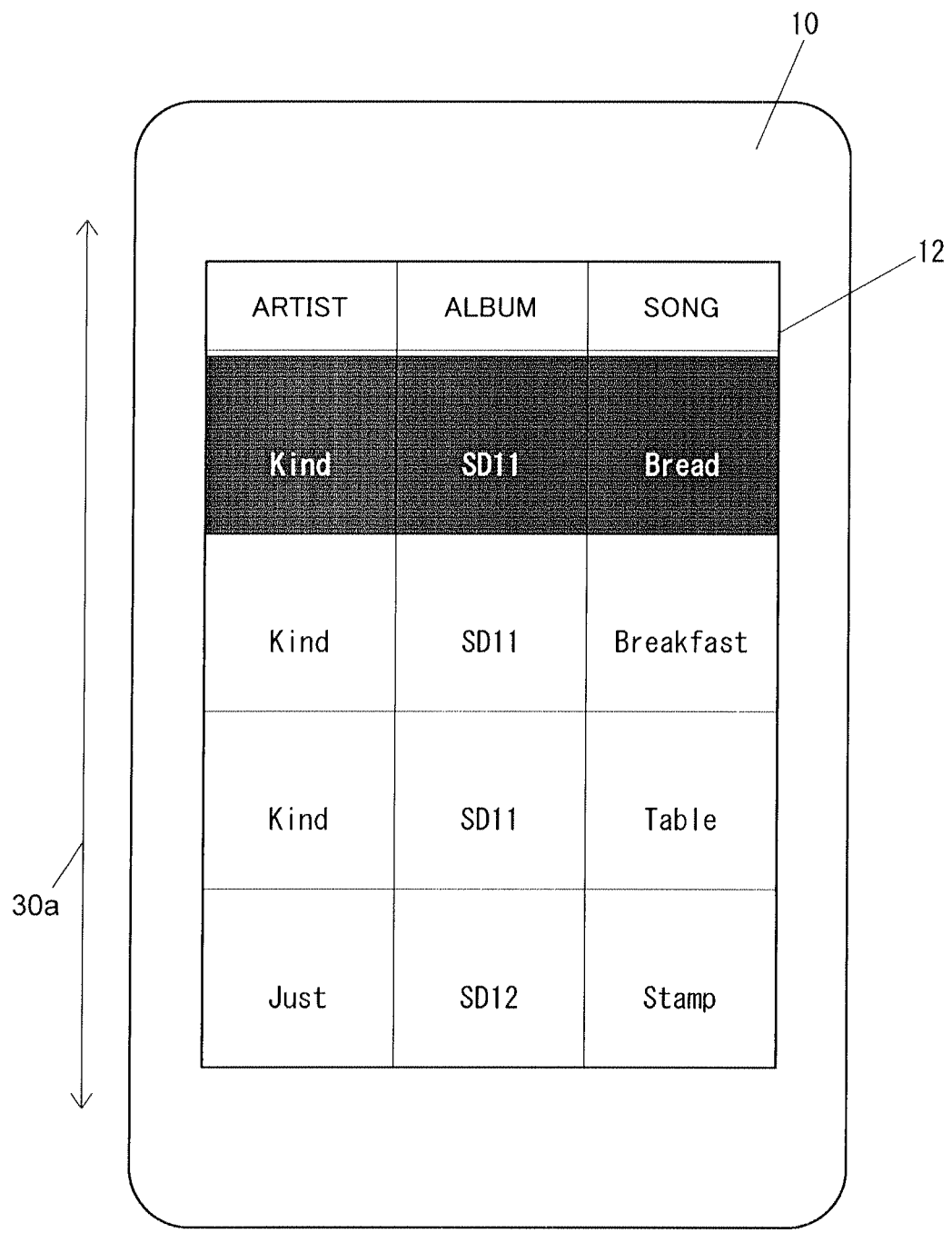
FIG. 29 shows the mobile device illustrated in FIG. 20 in a state where a part of the retrieval result list is displayed on the touch panel when retrieval is performed with the retrieval characters "SD11"

FIG. 29 shows the mobile device 10 in a state where a part of the retrieval result list 50 may be displayed on the touch panel 12 when retrieval may be performed with the retrieval characters "SD11".

When one or more retrieval characters are "SD11", in the process of S2110, the list display section 14e displays on the touch panel 12 the retrieval result list 50 illustrated in FIG. 28 in a state where a focus may be placed on the data specific information pieces retrieved with the retrieval characters "SD11" as illustrated in FIG. 29, that is, the data specific information pieces including all of the retrieval characters "SD11" in the attribute information piece of the hierarchical level "ALBUM". Note that, when there may be a plurality of data specific information pieces including all of the retrieval characters "SD11" in the attribute information piece of the hierarchical level "ALBUM" in the process of S2110, the list display section 14e places a focus on the data specific information pieces arranged in the top of the retrieval result list 50, among the plurality of data specific information pieces. That is, the list display section 14e highlights the data specific information pieces represented by the attribute information piece "Kind" of the hierarchical level "ARTIST", the attribute information piece "SD11" of the hierarchical level "ALBUM", and the attribute information piece "Bread" of the hierarchical level "SONG" to place a focus on the data specific information pieces.

Next, the operation of the mobile device 10 performed when the retrieval result list displayed on the touch panel 12 may be scrolled will be described.

Figure 30:
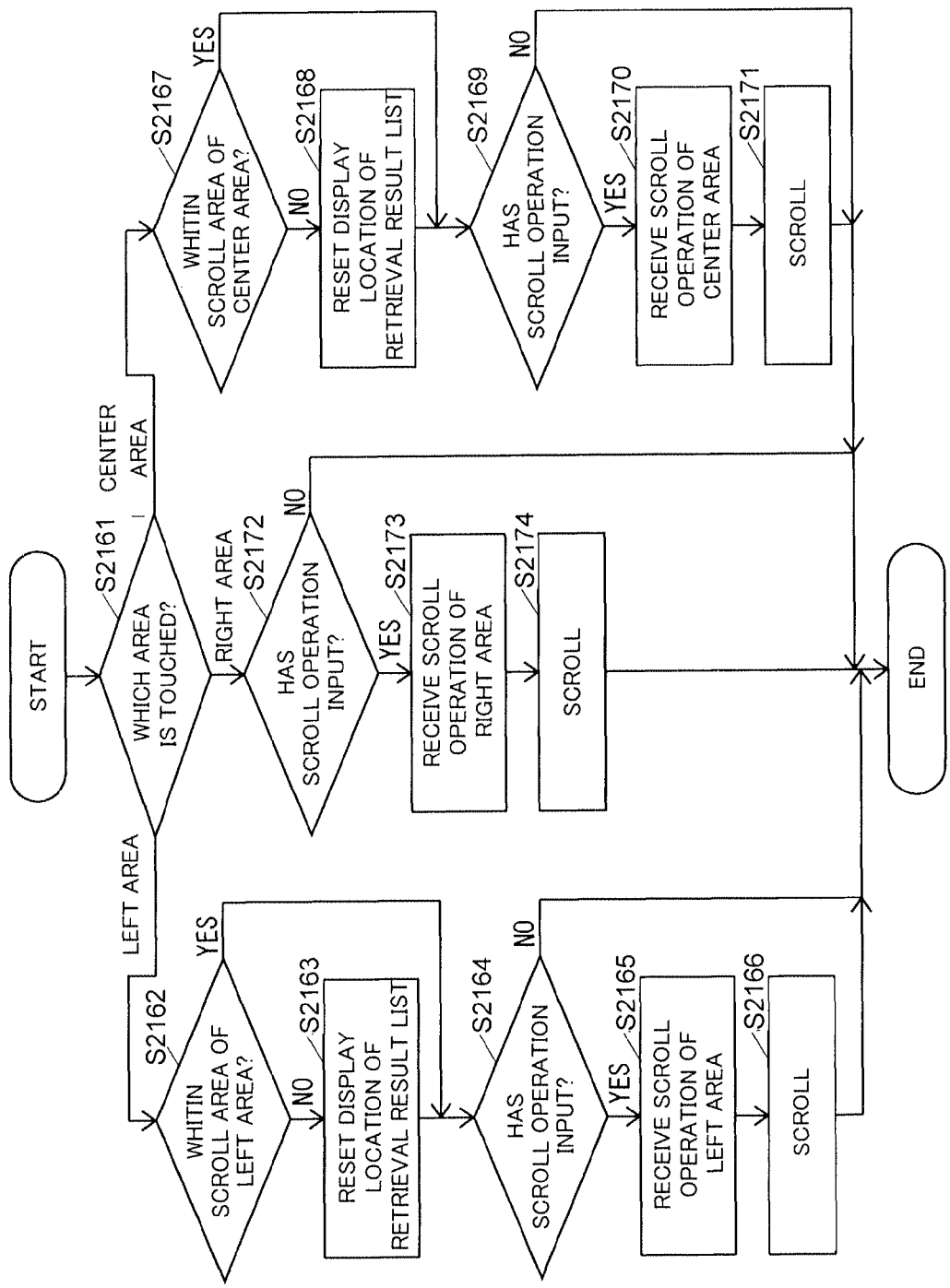
FIG. 30 shows the operation performed by the mobile device illustrated in FIG. 20 when an operation is received or initiated via an input to the touch panel.

When the touch panel 12 is touched while the mobile device 10 displays the retrieval result list 50 on the touch panel 12, the control unit 14 executes the operation illustrated in FIG. 30.

FIG. 30 shows the operation performed by the mobile device 10 when an operation may be received or initiated via an input to the touch panel 12.

As illustrated in FIG. 30, the scroll operation reception section 14f of the control unit 14 of the mobile device 10 determines which of the left area 12d, the center area 12e, and the right area 12f on the touch panel 12 may be touched (S2161).

If the scroll operation reception section 14f determines in S2161 that the left area 12d may be touched, the scroll operation reception section 14f determines whether or not the current display on the touch panel 12 may be within the scroll range of the left area 12d (S2162). In this case, the scroll range of the left area 12d may be a range of the data specific information pieces including all of one or more retrieval characters in the attribute information pieces of the hierarchical level "ALBUM".

If it is determined in S2162 that the display is not within the scroll range of the left area 12d, the list display section 14e resets the display location of the retrieval result list displayed on the touch panel 12 to an initial location (S2163). In this case, the initial location may be a location where the retrieval result list is displayed on the touch panel 12 in a state where a focus is placed on data specific information pieces retrieved with one or more retrieval characters. For example, when the one or more retrieval characters are "SD11" and the retrieval result list may be the retrieval result list 50 illustrated in FIG. 28, the mobile device 10 in which the display location of the retrieval result list 50 displayed on the touch panel 12 may be reset to the initial location is in the state illustrated in FIG. 29.

If the scroll operation reception section 14f determines in S2162 that the display may be within the scroll range of the left area 12d, or if the process of S2163 is ended, the scroll operation reception section 14f determines whether or not a scroll operation in the scroll direction indicated by the arrow 30a has been received via input onto the touch panel 12 (S2164).

If the scroll operation reception section 14f determines in S2164 that a scroll operation has not been input, the scroll operation reception section 14f ends the operation illustrated in FIG. 30.

If the scroll operation reception section 14f determines in S2164 that a scroll operation has been input, the scroll operation reception section 14f receives the scroll operation within the scroll range of the left area 12d (S2165).

Subsequently, the list display section 14e executes a scroll of the retrieval result list based on the operation received in S2165 (S2166), and ends the operation illustrated in FIG. 30.

When one or more retrieval characters are "SD11" and the retrieval result list is the retrieval result list 50 illustrated in FIG. 28, and then, the display location of the retrieval result list 50 displayed on the touch panel 12 may be the initial location illustrated in FIG. 29, the scroll range of the left area 12d, that is, the entire range (see FIG. 28) of the data specific information pieces including all of the retrieval characters "SD11" in the attribute information pieces of the hierarchical level "ALBUM", may be displayed on the touch panel 12. Therefore, when one or more retrieval characters are "SD11" and the retrieval result list is the retrieval result list 50 illustrated in FIG. 28, the display location of the retrieval result list 50 displayed on the touch panel 12 may be the initial location illustrated in FIG. 29, the list display section 14e does not scroll, even in receiving a scroll operation for the retrieval result list 50 input to the left area 12d, the retrieval result list 50 on the touch panel 12. Note that, if only a part of the range 51 is displayed on the touch panel 12, the list display section 14e scrolls the retrieval result list 50 on the touch panel 12 within the range 51 based on the scroll operation input to the left area 12d.

If the scroll operation reception section 14f determines in S2161 that the center area 12e on the touch panel 12 is touched, the scroll operation reception section 14f determines whether or not the current display on the touch panel 12 may be within the scroll range (S2167). In this case, the scroll range of the center area 12e may be the range of the data specific information pieces that have first two characters of the attribute information piece of the hierarchical level "ALBUM" that are the same as the first two characters of the retrieval characters.

If it is determined in S2167 that the current display on the touch panel 12 is not within the scroll range of the center area 12e, the list display section 14e resets the display location of the retrieval result list displayed on the touch panel 12 to an initial location (S2168). In this case, the initial location may be a location where the retrieval result list is displayed on the touch panel 12 in a state where a focus is placed on the data specific information pieces retrieved with the one or more retrieval characters. For example, when one or more retrieval characters are "SD11" and the retrieval result list is the retrieval result list 50 illustrated in FIG. 28, the mobile device 10 in which the display location of the retrieval result list 50 displayed on the touch panel 12 may be reset to the initial location is in the state illustrated in FIG. 29.

If the scroll operation reception section 14f determines in S2167 that the current display may be within the scroll range of the center area 12e, or if the process of S2168 is ended, the scroll operation reception section 14f determines whether or not a scroll operation in the scroll direction indicated by the arrow 30a has been received via an input to the touch panel 12 (S2169).

If the scroll operation reception section 14f determines in S2169 that the scroll operation has not been input, the scroll operation reception section 14f ends the operation illustrated in FIG. 30.

If the scroll operation reception section 14f determines in S2169 that the scroll operation has been received via an input, the scroll operation reception section 14f receives a scroll operation within the scroll range of the center area 12e (S2170).

Subsequently, the list display section 14e executes a scroll of the retrieval result list based on the operation received in S2170 (S2171), and ends the operation illustrated in FIG. 30.

Figure 31A:
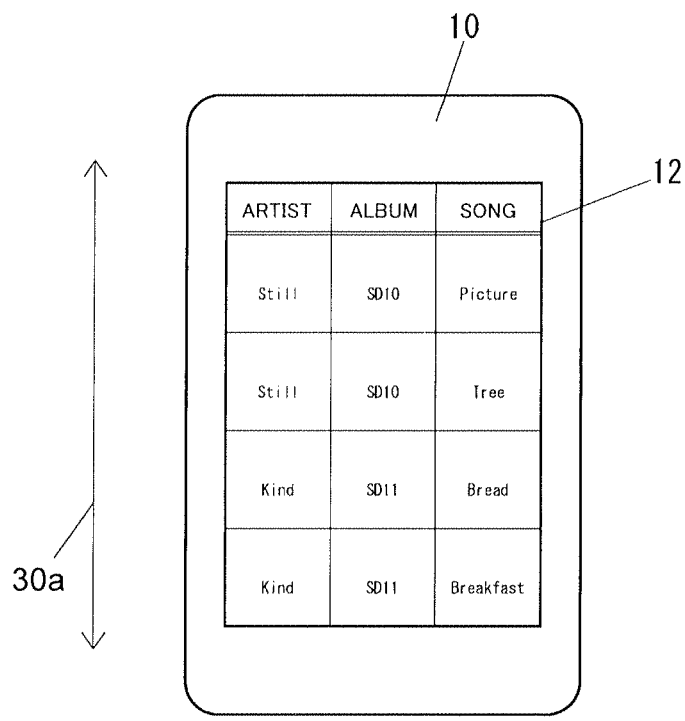
FIG. 31A shows the mobile device illustrated in FIG. 20 in a state where the location of the retrieval result list displayed on the touch panel is at the top end of a scroll range in a center area.
Figure 31B:
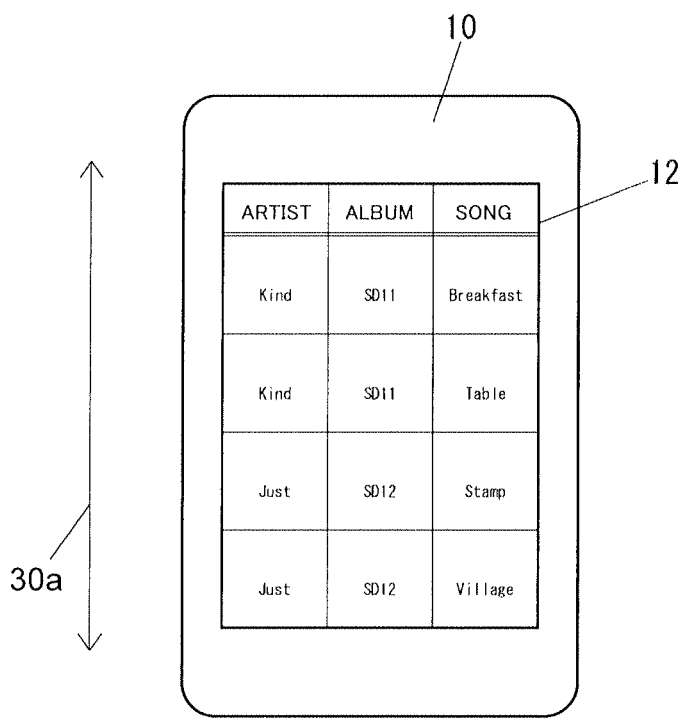
FIG. 31B shows the mobile device illustrated in FIG. 20 in a state where the location of the retrieval result list displayed on the touch panel is at the bottom end of the scroll range in the center area.

When one or more retrieval characters are "SD11" and the retrieval result list may be the retrieval result list 50 illustrated in FIG. 28, and then, the display location of the retrieval result list 50 displayed on the touch panel 12 may be the initial location illustrated in FIG. 29, only a part of the scroll range of the center area 12e, that is, the range 52 (see FIG. 28) of the data specific information pieces that have first two characters of the attribute information piece of the hierarchical level "ALBUM" that are the same as the first two characters, that is, "SD", of the retrieval characters "SD11" may be displayed on the touch panel 12. Therefore, when one or more retrieval characters are "SD11" and the retrieval result list is the retrieval result list 50 illustrated in FIG. 28, the display location of the retrieval result list displayed on the touch panel 12 may be the initial location illustrated in FIG. 29. Further, the list display section 14e scrolls, based on receiving a scroll operation for the retrieval result list 50 input to the center area 12e, and the retrieval result list 50 may be displayed on the touch panel 12 from the top end of the scroll range illustrated in FIG. 31A to the bottom end of the scroll range illustrated in FIG. 31B.

If the scroll operation reception section 14f determines in S2161 that the right area 12f on the touch panel 12 is touched, the scroll operation reception section 14f determines whether or not a scroll operation in the scroll direction indicated by the arrow 30a has been received via an input to the touch panel (S2172).

If the scroll operation reception section 14f determines in S2172 that a scroll operation has not been received via an input, the scroll operation reception section 14f ends the operation illustrated in FIG. 30.

If the scroll operation reception section 14f determines in S2172 that a scroll operation has been received via input, the scroll operation reception section 14f receives the scroll operation within the scroll range of the right area 12f (S2173).

Subsequently, the list display section 14e executes a scroll of the retrieval result list based on the operation received in S2173 (S2174), and ends the operation illustrated in FIG. 30. In this case, the scroll range of the right area 12f may be the entire range of the retrieval result list.

When one or more retrieval characters are "SD11" and the retrieval result list may be the retrieval result list 50 illustrated in FIG. 28, the display location of the retrieval result list 50 displayed on the touch panel 12 may be the initial location illustrated in FIG. 29. Further, only a part of the scroll range of the right area 12f, that is, the entire range 53 (see FIG. 28) of the retrieval result list 50 may be displayed on the touch panel 12. Therefore, when one or more retrieval characters are "SD11" and the retrieval result list may be the retrieval result list 50 illustrated in FIG. 28, the display location of the retrieval result list 50 displayed on the touch panel 12 may be the initial location illustrated in FIG. 29. Further, the list display section 14e may scroll, based on receiving a scroll operation for the retrieval result list 50 input in the right area 12f, the retrieval result list 50 on the touch panel 12 from the top end of the retrieval result list 50 to the bottom end of the retrieval result list 50.

Note that the user of the mobile device 10 can execute a certain operation, such as double tapping of one of the data specific information pieces displayed on the touch panel 12 and the like, to cause the mobile device 10 to reproduce a music file identified based on the data specific information piece.

As described above, after retrieving a data specific information piece with received one or more retrieval characters and displaying a retrieval result list in which data specific information pieces are arranged based on the degree of commonality with the one or more retrieval characters on the touch panel 12 (S2110), the mobile device 10 receives a scroll operation for the retrieval result list on the touch panel 12 (YES in S2164, YES in S2169, or YES in S2172). Further, the mobile device 10 causes the scroll range received by a scroll operation to differ among the areas, that is, the left area 12d, the center area 12e, and the right area 12f, arranged in the direction indicated by the arrow 30b that intersects with the direction scroll direction indicated by the arrow 30a in the retrieval result list on the touch panel 12 (S2165, S2170, or S2173), and thus, even when the user does not accurately know a target data specific information piece that may be to be retrieved, the mobile device 10 can enable the user to easily find the target data specific information piece that is to be retrieved.

In the mobile device 10, the scroll range of each of the left area 12d, the center area 12e, and the right area 12f may be set based on the degree of commonality of each data specific information piece in the retrieval result list and the one or more retrieval characters (S2165, S2170, or S2173). With this configuration, the mobile device 10 enables the user to select, from the left area 12d, the center area 12e, and the right area 12f, an area where the user inputs a scroll operation based on the degree of the user's knowing the target data specific information piece that is to be retrieved.

Therefore, the mobile device 10 can enable the user to easily find the target data specific information piece that is to be retrieved.

In the mobile device 10, the scroll range of the center area 12e may be the range of the data specific information pieces that have first two or more characters that are the same as the first two or more characters of retrieval characters (S2170). With this configuration, the mobile device 10 enables the user to select the center area 12e the scroll range of which may be the range of the data specific information pieces that do not match one or more retrieval characters but have commonality with the one or more retrieval characters, and thus, enables the user to easily find the target data specific information piece that may be to be retrieved even when the user does not accurately know the target data specific information piece that is to be retrieved.

Note that the mobile device 10 may set, as the scroll range of the center area 12e, the range of the data specific information pieces that have the first two or more characters that are the same as the first two or more characters of the retrieval characters. The mobile device 10 may set the range of the data specific information pieces as long as the number of characters of each of the data specific information pieces is equal to or greater than a certain number that is more than one and is less than the number of the characters of retrieval characters. For example, the mobile device 10 may set, as the scroll range of the center area 12e, the range of the data specific information pieces with three or more characters of which are the same as three or more characters of the retrieval characters.

Also, in the third embodiment, the mobile device 10 may set, as the scroll range of the center area 12e, the range of the data specific information pieces having the first two or more characters that are the same as the first two or more characters of the retrieval characters. Further, the range of the data specific information pieces may have a certain number of characters in a part other than the first part that are the same as those of the retrieval characters. For example, when one or more retrieval characters are "SD11", the mobile device 10 may set, as a candidate group, data specific information pieces including "SD", "D1", or "11" in the attribute information piece of the hierarchical level "ALBUM" (S2131) and set, as the scroll range of the center area 12e, the range of the data specific information pieces in the candidate group.

In the mobile device 10, the order of the sizes of the scroll ranges of the left area 12d, the center area 12e, and the right area 12f arranged in the direction indicated by the arrow 30b that intersects with the scroll direction indicated by the arrow 30a in the retrieval result list on the touch panel 12 may be the same as the order of the areas arranged in the direction indicated by the arrow 30b. With this configuration, the size of the scroll range of each of the left area 12d, the center area 12e, and the right area 12f, arranged in the direction indicated by the arrow 30b on the touch panel 12 from the left area 12d provided at one end to the right area 12f provided at the other end may be increased, and thus, the mobile device 10 can perform an intuitive operation as a scroll operation is performed for finding the target data specific information piece that is to be retrieved.

Note that although, in the mobile device 10, the area in which a scroll operation for a retrieval result list may be input on the touch panel 12 may be divided into three areas, the number of the divided areas may not limited to three and the area may be divided into a plurality of areas.

Figure 32:
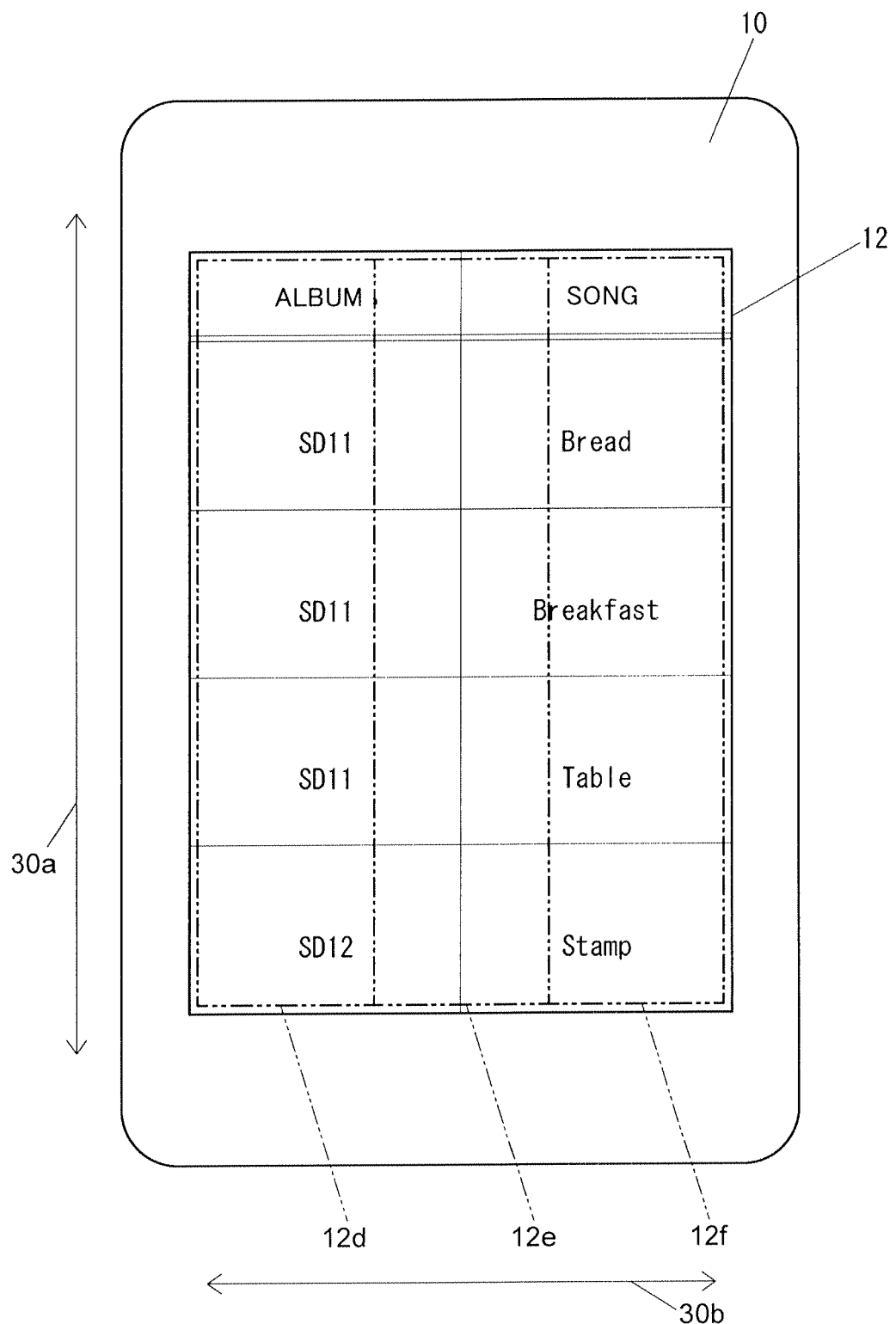
FIG. 32 shows the mobile device illustrated in FIG. 20 in a state where a part of the retrieval result list is displayed on the touch panel when retrieval is performed with the retrieval characters "SD11".

Also, in the mobile device 10, the area in which a scroll operation for a retrieval result list on the touch panel 12 matches the display area for the three hierarchical levels of the data specific information piece displayed on the touch panel 12 in the direction indicated by the arrow 30b. However, the mobile device 10 is not limited to the above-described configuration but may have a configuration, for example, illustrated in FIG. 32, in which the area on the touch panel 12 in which a scroll operation for a retrieval result list may be input does not match the display area on the touch panel 12 in which the hierarchical levels of the data specific information piece are displayed. Note that, in FIG. 32, a figure indicated by the alternate long and two dashes line represents an area on the touch panel 12 and is not actually displayed on the touch panel 12.

The mobile device 10 may not include the graphical user interface (GUI), such as a retrieval window, a retrieval button used for starting retrieval with one or more retrieval characters input to the retrieval window, and the like, and therefore, the user may not look for or operate the GUI, thus resulting in increase in usability for the user.

Also, the mobile device 10 does not include the GUI, such as a retrieval window, a retrieval button, and the like, and thus, a large display area in which information, such as the list 20 and the like, may be displayed can be ensured on the touch panel 12. Specifically, when the touch panel 12 may be small, it is effective ensuring on the touch panel 12 a large display area in which information, such as the list 20 and the like, is displayed.

The mobile device 10 receives one or more retrieval characters received via an input to the touch panel 12, possibly by handwriting, regardless of information, such as the list 20 and the like, displayed on the touch panel 12, and therefore, the degree of freedom of design of the screen on the touch panel 12 at the time of executing retrieval can be increased.

Note that although the mobile device 10 starts, when a certain operation may be received or initiated via an input to the operating unit 11, the operation illustrated in FIG. 23, the mobile device 10 may be configured to start the operation illustrated in FIG. 23 under a condition other than the condition where a certain operation is received or initiated via an input to the operating unit 11. For example, the mobile device 10 may be configured to start, when a certain GUI displayed on the touch panel 12 may be operated, the operation illustrated in FIG. 23, and may be configured to start, when the touch panel 12 may be pressed and held down, the operation illustrated in FIG. 23.

Although, in the operation illustrated in FIG. 23, the mobile device 10 ends, when a certain time has elapsed since measurement of time was started in S2101, reception of one or more retrieval characters, the mobile device 10 may be configured to end reception of one or more retrieval characters under a condition other than the condition where a certain time has elapsed. For example, the mobile device may be configured to end, when a certain operation received or initiated via an input to the operating unit 11, reception of one or more retrieval characters, and may be configured to end, when the touch panel 12 may be pressed and held down, reception of one or more retrieval characters. When the touch panel 12 may be pressed and held down, and then, the mobile device 10 ends reception of one or more retrieval characters, the mobile device 10 may reproduce a music file identified based on the data specific information piece displayed in a location on the touch panel 12 where the touch panel 12 may be pressed and held down.

Note that although, in the third embodiment, an example where a data specific information piece is retrieved for the hierarchical level "ALBUM" is described, the same applies to a case where a data specific information piece may be retrieved for the hierarchical level "ARTIST" and a case where a data specific information piece may be retrieved for the hierarchical level "SONG".

Although the retrieval device according to this embodiment handles a music file as data, the retrieval device may handle data, such as, for example, a document file, an image file, and the like, other than a music file.

Also, although the retrieval device according to this embodiment may be a mobile device, the retrieval device may be an electronic device other than a mobile device, as long as the electronic device includes a touch panel. For example, a retrieval device according to an embodiment of the present disclosure may be a multifunction peripheral (MFP), an imaging device of a device for exclusive use for printer, and the like.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A retrieval device comprising:
   a touch panel that displays a list, wherein a data specific information piece is arranged in the list and is represented by a hierarchical structure comprising a plurality of attribute information pieces;
   a retrieval character reception section that receives one or more retrieval characters of the data specific information piece for identifying data of a data group, wherein the retrieval character reception section receives the one or more retrieval characters via a handwritten input to the list on the touch panel, wherein one or more input locations are associated with the retrieval characters, wherein the one or more input locations are indicative of one or more hierarchical levels associated with the retrieval characters, and wherein receiving the retrieval characters is based on a comparison of a currently set hierarchical level to the one or more hierarchical levels associated with the retrieval characters;
   an information retrieval section that retrieves the data specific information piece with the one or more retrieval characters; and
   a retrieval result display section that displays a retrieval result of the information retrieval section on the touch panel, wherein the one or more retrieval characters that are input to the touch panel by handwriting are not displayed on the touch panel as part of the displayed retrieval result.

2. The retrieval device according to claim 1, wherein the information retrieval section retrieves the data specific information piece each time a single character of the one or more retrieval characters is received by the retrieval character reception section, and wherein the retrieval result display section displays the retrieval result on the touch panel each time the information retrieval section retrieves the data specific information piece.

3. The retrieval device according to claim 1, wherein, if the currently set hierarchical level is the highest hierarchical level, the retrieval character reception section:
   receives one or more characters by the handwritten input as the one or more retrieval characters if the hierarchical level corresponding to the handwritten input locations of the one or more characters on the touch panel is the highest hierarchical level; and
   avoids receiving the one or more characters by the handwritten input as the one or more retrieval characters if the hierarchical level corresponding to the handwritten input locations of the one or more characters to the touch panel is not the highest hierarchical level.

4. The retrieval device according to claim 3, wherein the retrieval character reception section:
   associates each of three or more areas arranged in a certain direction of a screen on the touch panel with a corresponding one of the plurality of hierarchical levels where an order of the three or more areas arranged in the certain direction corresponds to an order of a hierarchical relationship between the plurality of hierarchical levels, and
   receives the one or more characters input to the touch panel indicating the one or more retrieval characters of the hierarchical level corresponding to one of the three or more areas including the handwritten input location of the one or more characters.

5. The retrieval device according to claim 4, wherein the certain direction is a vertical direction, and the retrieval character reception section associates the three or more areas with the plurality of hierarchical levels in a state, wherein the order of the three or more areas arranged in the vertical direction corresponds to a hierarchical relationship between the plurality of hierarchical levels corresponding to the areas.

6. The retrieval device according to claim 1, further comprising:
   a scroll operation reception section that receives a scroll operation for a retrieval result list displayed by the retrieval result display section on the touch panel, wherein
   the information retrieval section retrieves a data retrieval information piece with the one or more retrieval characters and generates the retrieval result list in which the data specific information piece is arranged based on a degree of commonality with the one or more retrieval characters,
   the retrieval result display section displays the retrieval result list on the touch panel, and
   the scroll operation reception section sets a scroll range received by a scroll operation to differ among a plurality of areas arranged in a direction that intersects with a scroll direction of the retrieval result list on the touch panel.

7. The retrieval device according to claim 6, wherein the scroll range is set for each of the areas based on the degree of commonality of the data specific information piece in the retrieval result list with the one or more retrieval characters.

8. The retrieval device according to claim 7, wherein the scroll range of at least one of the plurality of areas is a range of the data specific information piece in which characters of a number are greater than or equal to a certain number, wherein the certain number is one or more and is less than a number of characters of the one or more retrieval characters.

9. The retrieval device according to claim 6, wherein the plurality of areas include three or more areas, and an order of sizes of respective scroll ranges for the areas correspond to the order of the three or more areas arranged in the direction that intersects with the scroll direction of the retrieval result list.

10. A retrieval method comprising:
  receiving, via a retrieval character reception section, one or more retrieval characters for a data specific information piece for identifying data of a data group, wherein the data specific information piece is represented by a hierarchical structure including a plurality of attribute information pieces;
  retrieving, via an information retrieval section, the data specific information piece with the one or more retrieval characters; and
  displaying, via a retrieval result display section, a retrieval result of the information retrieval section on a touch panel, wherein the one or more characters that are input to the touch panel by handwriting are not displayed on the touch panel as part of the displayed retrieval result;
  wherein receiving the one or more retrieval characters includes receiving the one or more retrieval characters via a handwritten input to a list on the touch panel, wherein the data specific information piece is arranged in the list and displayed on the touch panel, wherein one or more input locations are associated with the retrieval characters, wherein the one or more input locations are indicative of one or more hierarchical levels associated with the retrieval characters, and wherein receiving the retrieval characters is based on a comparison of a currently set hierarchical level to the one or more hierarchical levels associated with the retrieval characters.

11. The retrieval method according to claim 10, wherein, if the currently set hierarchical level is the highest hierarchical level,
  receiving the one or more retrieval characters via the retrieval character reception section comprises:
    receiving one or more characters by the handwritten input as the one or more retrieval characters if the hierarchical level corresponding to the handwritten input locations of the one or more characters on the touch panel is the highest hierarchical level; and
    avoiding receiving the one or more characters by the handwritten input as the one or more retrieval characters if the hierarchical level corresponding to the handwritten input locations of the one or more characters to the touch panel is not the highest hierarchical level.

12. The retrieval method according to claim 10, further comprising:
  receiving, via a scroll operation reception section, a scroll operation for a retrieval result list displayed by the retrieval result display section on the touch panel, wherein
  retrieving the data specific information piece via the information retrieval section includes retrieving the data specific information piece with the one or more retrieval characters and generating a retrieval result list in which the data specific information piece is arranged based on a degree of commonality with the one or more retrieval characters, wherein
  displaying the retrieval result via the retrieval result display section includes displaying the retrieval result list on the touch panel, and wherein
  receiving the scroll operation via the scroll operation reception section includes setting a scroll range received by the scroll operation to differ among a plurality areas arranged in a direction that intersects with a scroll direction of the retrieval result list on the touch panel.

13. A non-transitory, computer-readable recording medium that stores a retrieval program executable by a computer, the retrieval program comprising:
  a first program code that causes the computer to receive one or more retrieval characters for a data specific information piece for identifying data of a data group, wherein the computer receives the one or more retrieval characters via a handwritten input to a list on a touch panel wherein one or more input locations are associated with the retrieval characters, wherein the one or more input locations are indicative of one or more hierarchical levels associated with the characters, and wherein receiving the retrieval characters is based on a comparison of a currently set hierarchical level to the one or more hierarchical levels associated with the retrieval characters;
  a second program code that causes the computer to retrieve the data specific information piece with the one or more retrieval characters, wherein the data specific information piece is represented by a hierarchical structure including a plurality of attribute information pieces; and
  a third program code that causes the computer to display a retrieval result obtained by the second program code on the touch panel, wherein the data specific information piece is arranged and displayed on the touch panel, wherein the one or more retrieval characters that are input to the touch panel by handwriting are not displayed on the touch panel as part of the displayed retrieval result.

14. The non-transitory, computer-readable recording medium according to claim 13,
  wherein if the currently set hierarchical level is the highest hierarchical level,
  the first program code causes the computer to:
    receive one or more characters by the handwritten input as the one or more retrieval characters if the hierarchical level corresponding to the handwritten input locations of the one or more characters on the touch panel is the highest hierarchical level, and
    the first program code causes the computer to avoid receiving the one or more characters by the handwritten input as the one or more retrieval characters if the hierarchical level corresponding to the handwritten input locations of the one or more characters to the touch panel is not the highest hierarchical level.

15. The non-transitory, computer-readable recording medium according to claim 14, wherein
  the second program code causes the computer to retrieve the data specific information piece for each character of the one or more retrieval characters, and wherein
  the third program code causes the computer to display the retrieval result on the touch panel each time the data specific information piece is retrieved.

16. The non-transitory, computer-readable recording medium according to claim 13, further comprising:
  a fourth program code that causes the computer to receive a scroll operation for the retrieval result list displayed by the third program code on the touch panel, wherein
  the second program code causes the computer to:
    retrieve a data specific information piece with the one or more retrieval characters received via the first program code, and generate the retrieval result list in which the data specific information piece is arranged based on a degree of commonality with the one or more retrieval characters, the third program code causes the computer to display the retrieval result list generated on the touch panel via the second program code, and the fourth program code causes the computer to set a scroll range for each of a plurality of areas arranged in a direction that intersects with a scroll direction of the retrieval result list on the touch panel, wherein the scroll range received by the scroll operation differs from the plurality of areas.

17. The non-transitory, computer-readable recording medium according to claim 16, wherein the scroll range is set for each of the plurality of areas based on the degree of commonality of the data specific information piece in the retrieval result list with the one or more retrieval characters.

18. The non-transitory, computer-readable recording medium according to claim 17, wherein the scroll range of at least one of the plurality of areas is a range of the data specific information piece in which characters of a number are greater than or equal to a certain number, wherein the certain number is one or more and is less than a number of characters of the one or more retrieval characters.

19. The non-transitory, computer-readable recording medium according to claim 16, wherein the plurality of areas include three or more areas, and an order of sizes of respective scroll ranges for the areas correspond to the order of the three or more areas arranged in the direction that intersects with the scroll direction of the retrieval result list.

* * * * *